US012793499B2

(12) United States Patent
Nelson

(10) Patent No.: US 12,793,499 B2
(45) **Date of Patent: *Nov. 10, 2026**

(54) AUGMENTED REALITY INTEGRATION IN ELECTRONIC GAMING MACHINES

(71) Applicant: IGT, Las Vegas, NV (US)

(72) Inventor: Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 16 days.

This patent is subject to a terminal disclaimer.

(21) Appl. No.: 19/030,073

(22) Filed: Jan. 17, 2025

(65) Prior Publication Data

US 2025/0166447 A1 May 22, 2025

Related U.S. Application Data

(63) Continuation of application No. 18/657,872, filed on May 8, 2024, now Pat. No. 12,361,782, which is a continuation of application No. 18/121,262, filed on Mar. 14, 2023, now Pat. No. 12,014,594, which is a continuation of application No. 16/052,062, filed on Aug. 1, 2018, now Pat. No. 11,625,974.

(51) Int. Cl.
*G07F 17/32* (2006.01)
*G06T 19/00* (2011.01)

(52) U.S. Cl.
CPC ........ *G07F 17/3211* (2013.01); *G06T 19/006* (2013.01); *G07F 17/3223* (2013.01); *G07F 17/3225* (2013.01)

(58) Field of Classification Search
CPC ............. G07F 17/3211; G07F 17/3225; G07F 17/3255; G07F 17/3258; G07F 17/32; G07F 17/3213; G07F 17/3218; G07F 17/3223; G07F 17/3227; G07F 17/323; G07F 17/3244; G07F 17/3246; G07F 17/3248; G07F 17/329; G07F 17/3293; G07F 17/34; G06T 19/006; G06T 2200/02
See application file for complete search history.

(56) References Cited

U.S. PATENT DOCUMENTS

| | | | |
|---|---|---|---|
| 9,311,774 B2 * | 4/2016 | Weber | G07F 17/3239 |
| 9,511,291 B2 * | 12/2016 | Lyons | A63F 13/214 |
| 2012/0184352 A1 | 7/2012 | Detlefsen | |
| 2012/0244939 A1 | 9/2012 | Braun | |
| 2014/0121015 A1 | 5/2014 | Massing | |
| 2015/0065219 A1 | 3/2015 | Kiely | |
| 2015/0228148 A1 | 8/2015 | Barnes | |
| 2018/0204416 A1 | 7/2018 | Perea-OcHoa | |

* cited by examiner

*Primary Examiner* — Ankit B Doshi
(74) *Attorney, Agent, or Firm* — Sheridan Ross P.C.

(57) ABSTRACT

An electronic gaming machine according to some embodiments includes a processing circuit, a display screen coupled to the processing circuit, and a transceiver coupled to the processing circuit and providing wireless communications with an augmented reality (AR) display device that is separate from the electronic gaming machine. The processing circuit displays a game element in a first screen area of the display screen, and transmits, via the transceiver, screen location data to the AR display device identifying a second screen area on the display screen, other than the first screen area, that is available for the AR display device to overlay AR graphics in a field of view of a user of the AR display device without overlaying the game element displayed in the first screen area of the display screen.

19 Claims, 17 Drawing Sheets

AUGMENTED REALITY INTEGRATION IN ELECTRONIC GAMING MACHINES

CROSS REFERENCE TO RELATED APPLICATIONS

The present application is a continuation of U.S. patent application Ser. No. 18/657,872, filed May 8, 2024, entitled, "AUGMENTED REALITY INTEGRATION IN ELECTRONIC GAMING MACHINES," which is a continuation of U.S. patent application Ser. No. 18/121,262, filed Mar. 14, 2023, entitled, "AUGMENTED REALITY INTEGRATION IN ELECTRONIC GAMING MACHINES," which is a continuation of U.S. patent application Ser. No. 16/052,062, filed Aug. 1, 2018, entitled, "AUGMENTED REALITY INTEGRATION IN ELECTRONIC GAMING MACHINES," the disclosure and content of each of which are incorporated herein in their entirety.

BACKGROUND

Embodiments described herein relate to augmented reality systems and methods, and in particular to electronic gaming machines that interoperate with augmented reality systems.

Electronic gaming machines (EGMs) are systems that allow users to place a wager on the outcome of a random event, such as the spinning of mechanical or virtual reels or wheels, the playing of virtual cards, the rolling of mechanical or virtual dice, the random placement of tiles on a screen, etc. Manufacturers of EGMs have incorporated a number of enhancements to the EGMs to allow players to interact with the EGMs in new and more engaging ways. For example, early slot machines allowed player interaction by pulling a lever or arm on the machine. As mechanical slot machines were replaced by electronic slot machines, a range of new player interface devices became available to EGM designers and were subsequently incorporated into EGMs. Examples of such interface devices include electronic buttons, wheels, and, more recently, touchscreens and three-dimensional display screens.

SUMMARY

An electronic gaming machine according to some embodiments includes a processing circuit, a display screen coupled to the processing circuit, and a transceiver coupled to the processing circuit and configured to provide wireless communications with an augmented reality (AR) display device that is separate from the electronic gaming machine. The processing circuit displays a game element in a first screen area of the display screen, and transmits, via the transceiver, screen location data to the AR display device identifying a second screen area on the display screen, other than the first screen area, that is available for the AR display device to overlay AR graphics in a field of view of a user of the AR display device without overlaying the game element displayed in the first screen area of the display screen.

The element may include a first game element, and the processing circuit may transmit a second game element to the AR device for display by the AR device in the second screen area of the display screen.

The processing circuit may transmit a second game element to the AR device for display by the AR device outside of the display screen.

The processing circuit may transmit a state of the game element to the AR device. The state of the game element determines whether the AR device is permitted to overlay AR graphics in the field of view of the user of the AR device over the game element.

The processing circuit may transmit an updated state of the game element to the AR device in response to detecting a change in the state of the game element.

The processing circuit may transmit a code to the AR device that indicates when the AR device can use the second screen area to display AR graphics.

The screen location data may include locations of game elements that are legally or contractually required to be displayed by the electronic gaming machine.

The screen location data may include a reel position of a virtual reel displayed on the display screen, a payline location, a service window location and/or a credit meter location.

The processing circuit may transmit to the AR device a reel state of a virtual reel displayed on the display screen, payline state, service window state, payline wins, credit meter changes, win animations, and/or system events.

The processing circuit may transmit information to the AR device about location of a peripheral device on a cabinet of the electronic gaming machine outside the display screen.

The processing circuit may transmit a second game element to the AR device and to transmit a command to the AR device to display the second game element within the field of view of the user.

The processing circuit may transmit screen location data identifying a third screen location, and the command instructs the AR device to display the second game element to overlay the third screen location in the field of view of the user.

The screen location data may identify a plurality of screen areas in which game elements are displayed that are not to be obscured by images displayed by the AR device.

An augmented reality device according to some embodiments includes a processing circuit, a transceiver coupled to the processing circuit, and a display device coupled to the processing circuit and configured to display virtual images within a field of view of a user. The processing circuit receives, via the transceiver, screen location data from an electronic gaming machine including a display screen within the field of view of the user, the screen location data identifying a first screen area on the display screen, and displays a virtual game element in the field of view of the user outside the first screen area of the display screen.

The processing circuit may receive a game event from the electronic gaming machine, and to display the virtual game element in response to the game event.

The screen location data may identify a second screen area on the display screen that is distinct from the first screen area, and the processing circuit may display the virtual game element to overlay the second screen area on the display screen.

The processing circuit may display the virtual game element outside the display screen.

The processing circuit may receive a second virtual game element from the electronic gaming machine and display the second virtual game element within the field of view of the user.

The processing circuit may receive a state of the second game element and display the second game element overlaying the first screen area of the display screen in response to the state of the second game element.

The augmented processing circuit may receive an updated state of the second game element from the electronic gaming machine in response to a change in the state of the second game element.

The screen location data may include a reel position of a virtual reel displayed on the display screen, a payline location, a service window location and/or a credit meter location.

The processing circuit may receive state information including a reel state of a virtual reel displayed on the display screen, a payline state, a service window state, payline wins, credit meter changes, win animations, and/or system events, and the processing circuit may display the virtual game element in response to the state information.

The processing circuit may receive peripheral information about location of a peripheral device on a cabinet of the electronic gaming machine outside the display screen, and the processing circuit may display the virtual game element in response to the peripheral information.

DETAILED DESCRIPTION

Embodiments of the inventive concepts provide systems and methods for displaying three-dimensional content on or in connection with an electronic gaming machine (EGM), or even independently from an EGM, to a player of an EGM or an observer (non-player) who is watching a player play an EGM. The three dimensional content may be associated with content that is displayed on the EGM. According to various embodiments, the 3D content can be rendered to the player on an augmented reality viewer, such as an augmented reality headset that communicates with the EGM so that the 3D content displayed to the player on the augmented reality headset is coordinated with the content displayed on the EGM. "Augmented reality" or "AR" may also be referred to as "mixed reality."

Some embodiments provide a headset display with pass through mixed reality rendering. The 3D model and 3D scanner can be used to track and locate objects, such as a user, a user's hand, other players, EGMs, etc., within an area, such as a casino floor. The headset display allows the user to see 3D virtual objects that appear to be physically present in the real world. The headset display also allows the user to move around while 3D rendered virtual objects (e.g. interface buttons, avatars, videos, personally pinned alerts/notifications/statistics etc.) may appear to stay in place or move along with the player. These and other embodiments are described in more detail below.

Augmented Reality EGM Systems and Viewers

Figure 1:
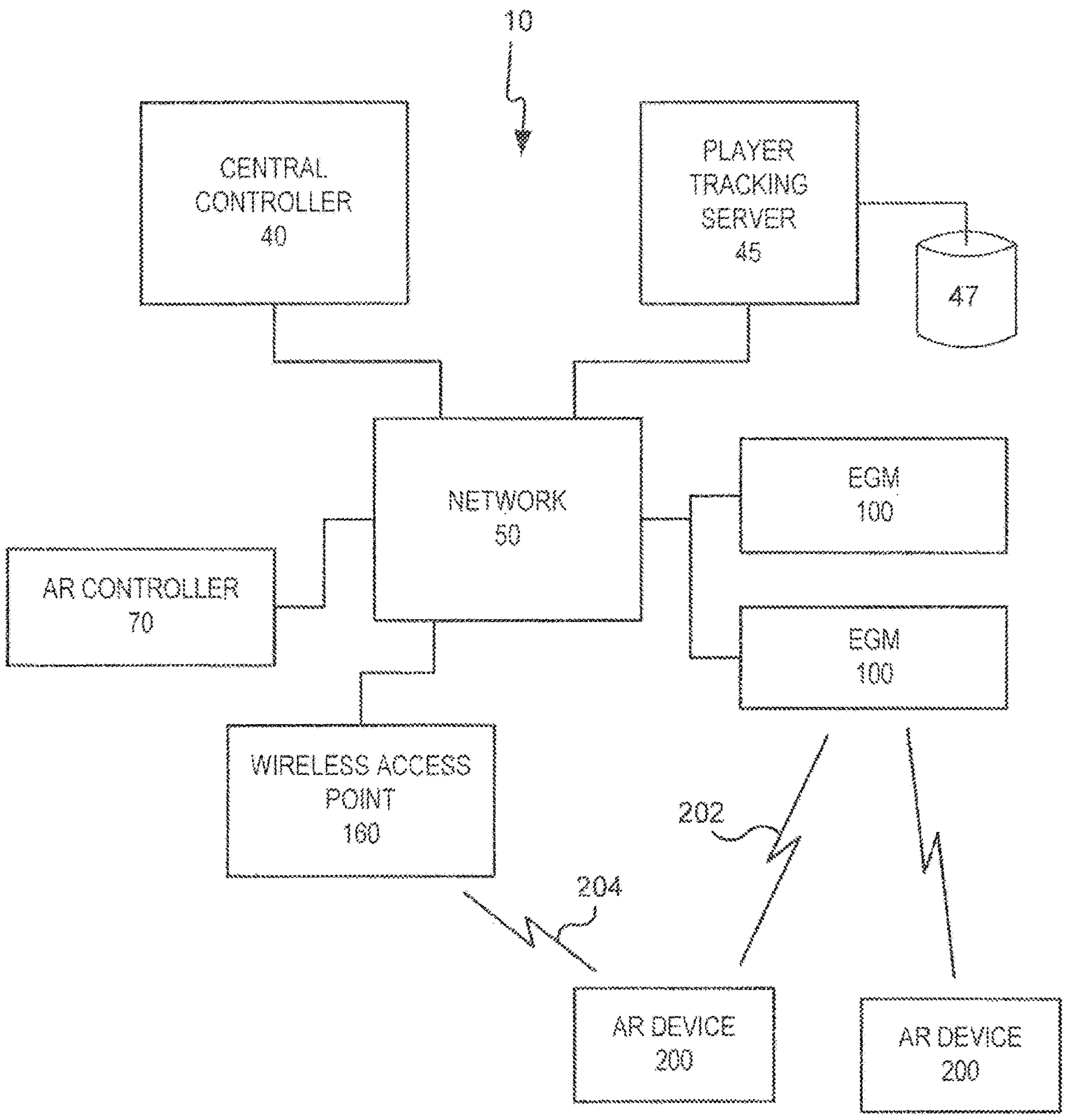
FIG. 1 is a schematic block diagram illustrating a network configuration for a plurality of gaming devices according to some embodiments.

Referring to FIG. 1, a gaming system 10 including a plurality of EGMs 100 is illustrated. The gaming system 10 may be located, for example, on the premises of a gaming establishment, such as a casino. The EGMs 100, which are typically situated on a casino floor, may be in communication with each other and/or at least one central controller 40 through a data network or remote communication link 50. The data communication network 50 may be a private data communication network that is operated, for example, by the gaming facility that operates the EGM 100. Communications over the data communication network 50 may be encrypted for security. The central controller 40 may be any suitable server or computing device which includes at least one processor and at least one memory or storage device. Each EGM 100 may include a processor that transmits and receives events, messages, commands or any other suitable data or signal between the EGM 100 and the central controller 40. The EGM processor is operable to execute such communicated events, messages or commands in conjunction with the operation of the EGM. Moreover, the processor of the central controller 40 is configured to transmit and receive events, messages, commands or any other suitable data or signal between the central controller 40 and each of the individual EGMs 100. In some embodiments, one or more of the functions of the central controller 40 may be performed by one or more EGM processors. Moreover, in some embodiments, one or more of the functions of one or more EGM processors as disclosed herein may be performed by the central controller 40.

A wireless access point 160 provides wireless access to the data communication network 50. The wireless access point 160 may be connected to the data communication network 50 as illustrated in FIG. 1, or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, a mixed reality viewer 200, or AR device 200, is provided. The AR device 200 communicates with one or more elements of the system 10 to render two dimensional (2D) and/or three dimensional (3D) content to a player of one of the EGMs 100 in a virtual space, while at the same time allowing the player to see objects in the real space around the player. That is, the AR device 200 combines a virtual image with real images perceived by the user, including images of real objects as well as images displayed by the EGM 100. In this manner, the AR device 200 "mixes" real and virtual reality into a single viewing experience for the player. In some embodiments, the AR device 200 may be further configured to enable the player to interact with both the real and virtual objects displayed to the player by the AR device 200.

The AR device 200 communicates with one or more elements of the system 10 to coordinate the rendering of mixed reality images, and in some embodiments mixed reality 3D images, to the player. For example, in some embodiments, the AR device 200 may communicate directly with an EGM 100 over a wireless interface 202, which may be a WiFi link, a Bluetooth link, an NFC link, etc. In other embodiments, the AR device 200 may communicate with the data communication network 50 (and devices connected thereto, including EGMs) over a wireless interface 204 with the wireless access point 160. The wireless interface 204 may include a WiFi link, a Bluetooth link, an NFC link, etc. In still further embodiments, the AR device 200 may communicate simultaneously with both the EGM 100 over the wireless interface 202 and the wireless access point 160 over the wireless interface 204. In these embodiments, the wireless interface 202 and the wireless interface 204 may use different communication protocols and/or different communication resources, such as different frequencies, time slots, spreading codes, etc. For example, in some embodiments, the wireless interface 202 may be a Bluetooth link, while the wireless interface 204 may be a WiFi link.

The wireless interfaces 202, 204 allow the AR device 200 to coordinate the generation and rendering of mixed reality images to the player via the AR device 200.

In some embodiments, the gaming system 10 includes a mixed reality controller, or AR controller 70. The AR controller 70 may be a computing system that communicates through the data communication network 50 with the EGMs 100 and the AR devices 200 to coordinate the generation and rendering of virtual images to one or more players using the AR devices 200. The AR controller 70 may be implemented within or separately from the central controller 40.

In some embodiments, the AR controller 70 may coordinate the generation and display of the virtual images of the same virtual object to more than one player by more than one AR device 200. As described in more detail below, this may enable multiple players to interact with the same virtual object together in real time. This feature can be used to provide a shared multiplayer experience to multiple players at the same time. In some embodiments, the AR controller 70 may be included within the AR device 100 itself.

Moreover, in some embodiments, the AR controller 70 may coordinate the generation and display of the same virtual object to players at different physical locations, as will be described in more detail below.

The AR controller 70 may store a three dimensional wireframe map of a gaming area, such as a casino floor, and may provide the three dimensional wireframe map to the AR devices 200. The wireframe map may store various information about EGMs in the gaming area, such as the identity, type and location of various types of EGMs. The three dimensional wireframe map may enable an AR device 200 to more quickly and accurately determine its position and/or orientation within the gaming area, and also may enable the AR device 200 to assist the player in navigating the gaming area while using the AR device 200.

In some embodiments, at least some processing of virtual images and/or objects that are rendered by the AR devices 200 may be performed by the AR controller 70, thereby offloading at least some processing requirements from the AR devices 200.

Referring to FIGS. 2A to 2D, the AR device 200 may be implemented in a number of different ways. For example, referring to FIG. 2A, in some embodiments, an AR device 200A may be implemented as a 3D headset including a pair of semitransparent lenses 212 on which images of virtual objects may be displayed. Different stereoscopic images may be displayed on the lenses 212 to create an appearance of depth, while the semitransparent nature of the lenses 212 allow the user to see both the real world as well as the 3D image rendered on the lenses 212. The AR device 200A may be implemented, for example, using a Hololens™ from Microsoft Corporation. The Microsoft Hololens includes a plurality of cameras and other sensors 211 that the device uses to build a 3D model of the space around the user. The device 200A can generate a 3D image to display to the user that takes into account the real world objects around the user and allows the user to interact with the 3D object.

The device 200A may further include other sensors, such as a gyroscopic sensor, a GPS sensor, one or more accelerometers, and/or other sensors that allow the device 200A to determine its position and orientation in space. In further embodiments, the device 200A may include one or more cameras that allow the device 200A to determine its position and/or orientation in space using visual simultaneous localization and mapping (VSLAM). The device 200A may further include one or more microphones and/or speakers that allow the user to interact audibly with the device.

Figure 2A:
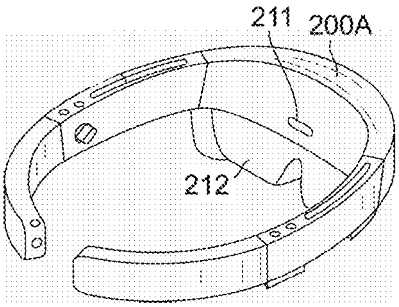
FIGS. 2A to 2D illustrate augmented reality viewing devices according to various embodiments.
Figure 2B:
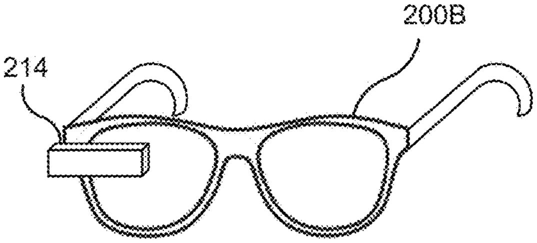

Referring to FIG. 2B, an AR device 200B may be implemented as a pair of glasses 200B including a transparent prismatic display 214 that displays an image to a single eye of the user. An example of such a device is the Google Glass device. Such a device may be capable of displaying images to the user while allowing the user to see the world around the user, and as such can be used as a mixed reality viewer. However, it will be appreciated that the device 200B may be incapable of displaying 3D images to the user.

Figure 2C:
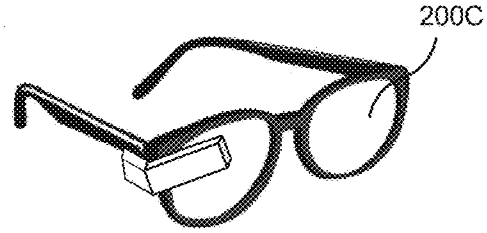
Figure 2D:
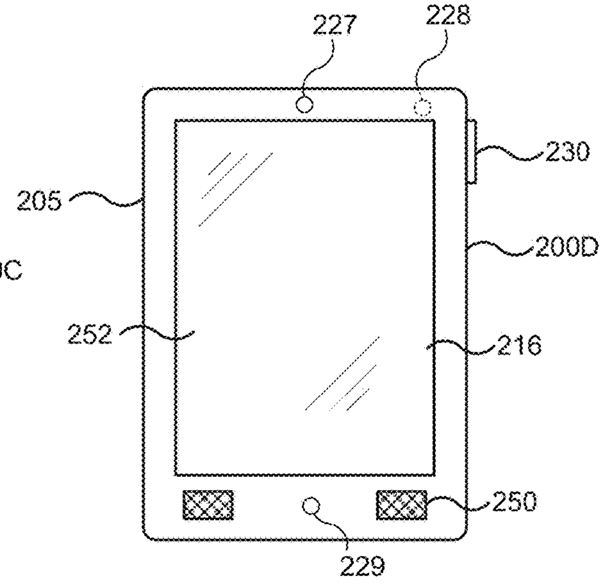

In other embodiments, referring to FIG. 2C, the AR device may be implemented using a virtual retinal display device 200C. In contrast to devices that display an image within the field of view of the user, a virtual retinal display raster scans an image directly onto the retina of the user. Like the device 200B, the virtual retinal display device 200C combines the displayed image with surrounding light to allow the user to see both the real world and the displayed image. However, also like the device 200B, the virtual retinal display device 200C may be incapable of displaying 3D images to the user.

In still further embodiments, an AR device 200D may be implemented using a mobile wireless device, such as a mobile telephone, a tablet computing device, a personal digital assistant, or the like. The device 200D may be a handheld device including a housing 205 on which a touchscreen display device 216 including a digitizer 252 is provided. An input button 230 may be provided on the housing and may act as a power or control button. A rear facing camera 227 may be provided in a front face of the housing 205. The device 200D may further include a front facing camera 228 on a rear face of the housing 205. The device 200D may include one or more speakers 250 and a microphone 229. The device 200D may provide a mixed reality display by capturing a video signal using the front facing camera 228 and displaying the video signal on the display device 216, and also displaying a rendered image of a virtual object over the captured video signal. In this manner, the user may see both a mixed image of both a real object in front of the device 200D as well as a virtual object superimposed over the real object to provide a mixed reality viewing experience.

Figure 2E:
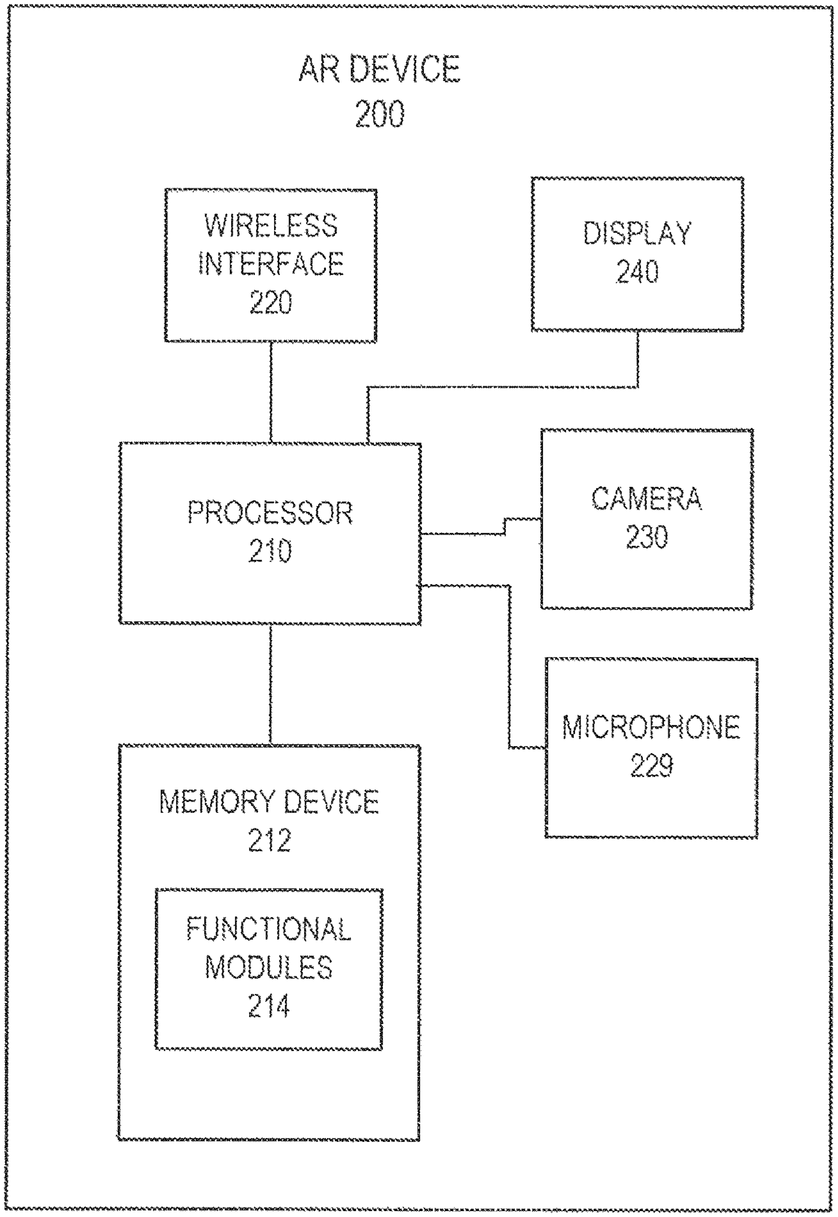
FIG. 2E is a schematic block diagram of an augmented reality device according to some embodiments.

FIG. 2E is a block diagram that illustrates various components of an AR device 200 according to some embodiment. As shown in FIG. 2E, the AR device 200 may include a processor 210 that controls operations of the AR device 200. Although illustrated as a single processor, multiple special purpose and/or general purpose processors and/or processor cores may be provided in the AR device 200. For example, the AR device 200 may include one or more of a video processor, a signal processor, a sound processor and/or a communication controller that performs one or more control functions within the AR device 200. The processor 210 may be variously referred to as a "controller," "microcontroller," "microprocessor" or simply a "computer." The processor may further include one or more application-specific integrated circuits (ASICs).

Various components of the AR device 200 are illustrated in FIG. 2E as being connected to the processor 210. It will be appreciated that the components may be connected to the processor 210 through a system bus, a communication bus and controller, such as a USB controller and USB bus, a network interface, or any other suitable type of connection.

The AR device 200 further includes a camera 230 for generating a video signal and a display 240 for displaying AR graphics to a user as virtual images or virtual elements, and a microphone 229 for receiving audio signals, such as voice commands from a user. The AR graphics may be displayed directly within a field of view so as to appear to be present within a scene and/or may be digitally added to a live video signal so as to appear to be present within the live video signal.

The AR device 200 further includes a memory device 212 that stores one or more functional modules 214 for performing the operations described herein.

The memory device 212 may store program code and instructions, executable by the processor 210, to control the AR device 200. The memory device 210 may include random access memory (RAM), which can include volatile and/or non-volatile RAM (NVRAM) and other forms as commonly understood in the gaming industry. In some embodiments, the memory device 212 may include read only memory (ROM). In some embodiments, the memory device 212 may include flash memory and/or EEPROM (electrically erasable programmable read only memory). Any other suitable magnetic, optical and/or semiconductor memory may operate in conjunction with the gaming device disclosed herein.

The AR device 200 may include a wireless interface 220 that enables the AR device 200 to communicate with remote devices, such as EGMs 100 and/or an AR controller 70 over a wired and/or wireless communication network, such as a local area network (LAN), wide area network (WAN), cellular communication network, wireless LAN (Wifi), Bluetooth, near-field communications (NFC) or other data communication network. The wireless interface 220 may include multiple radios to support multiple types of simultaneous connections. For example, the wireless interface may include both a Wifi radio transceiver and a Bluetooth radio transceiver.

Electronic Gaming Machines

Figure 3A:
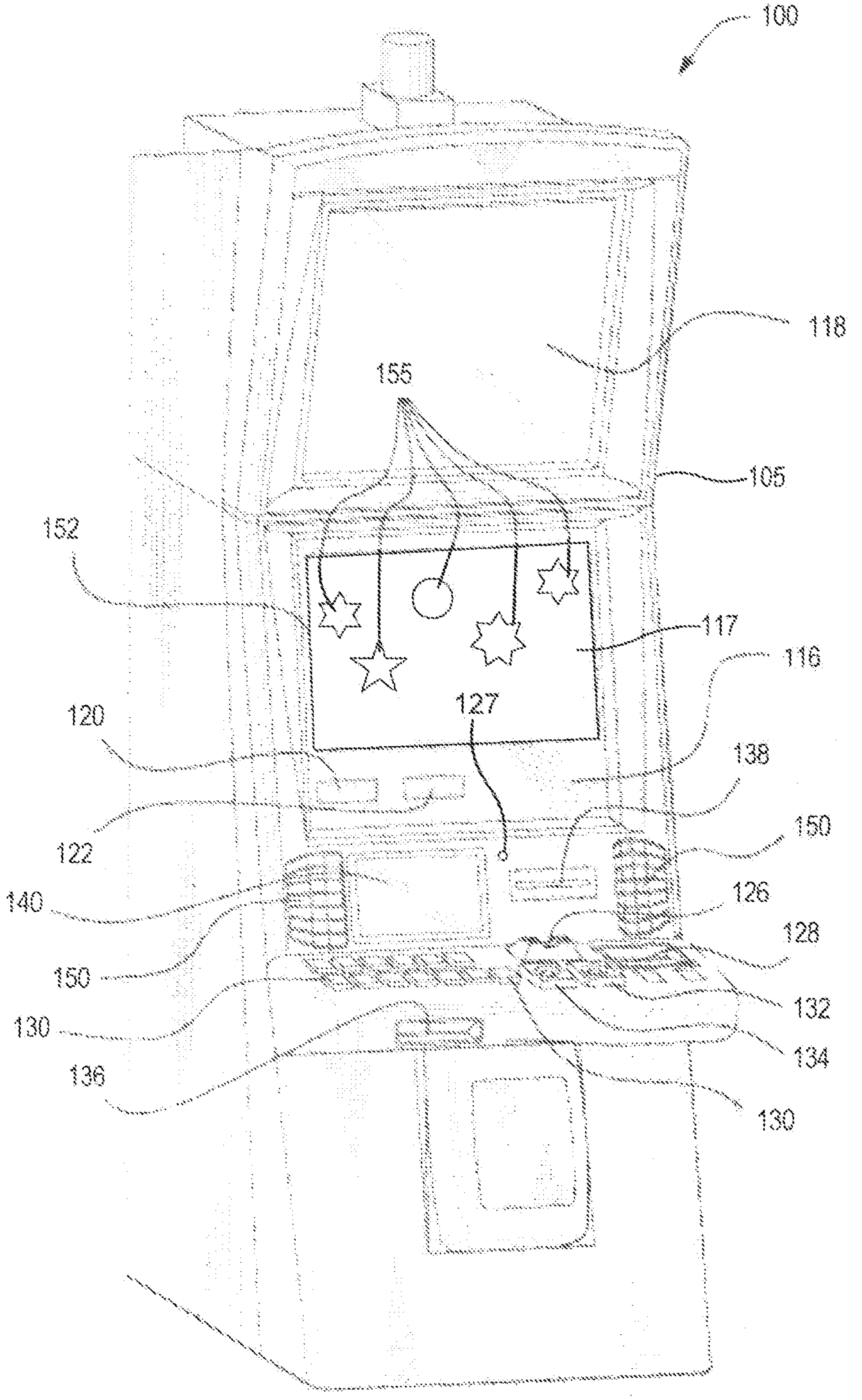
FIG. 3A is a perspective view of an electronic gaming device that can be configured according to some embodiments.
Figure 3B:
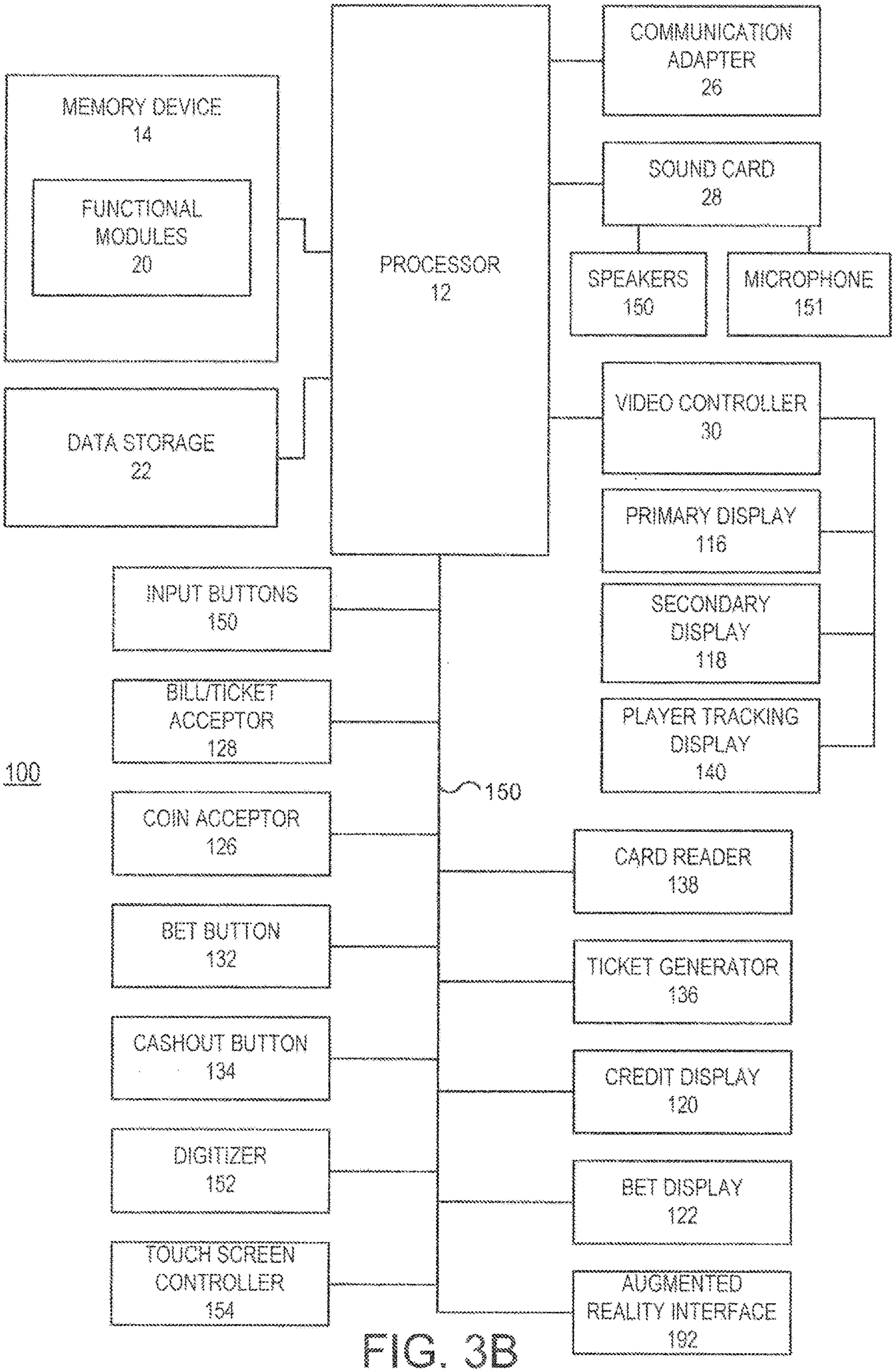
FIG. 3B is a schematic block diagram illustrating an electronic configuration for a gaming device according to some embodiments.
Figure 3C:
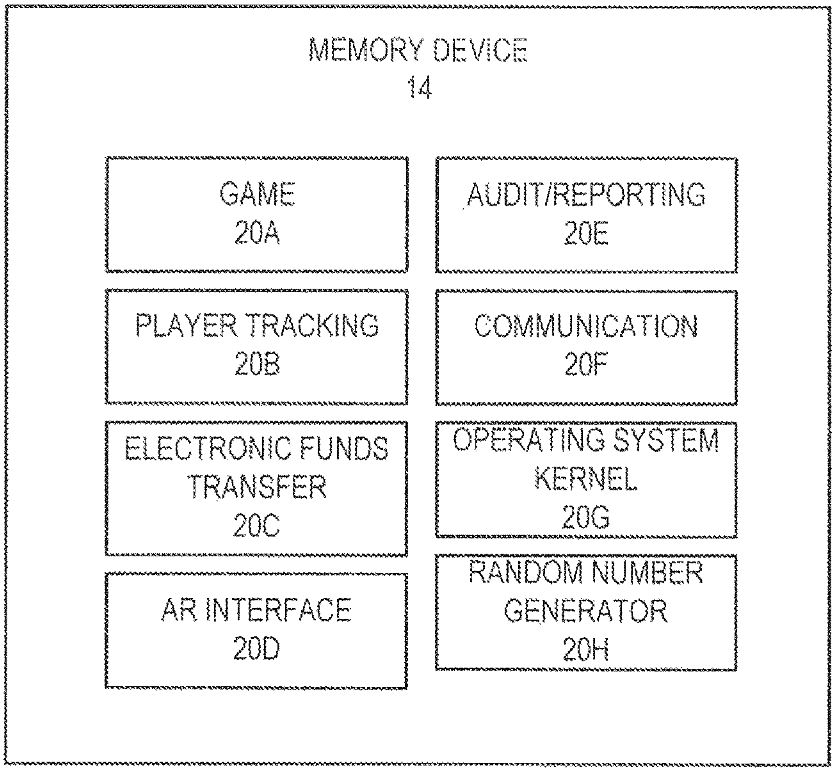
FIG. 3C is a schematic block diagram that illustrates various functional modules of an electronic gaming device according to some embodiments.

An example of an electronic gaming machine (EGM) that can interact with mixed reality viewers according to various embodiments is illustrated in FIGS. 3A, 3B, and 3C in which FIG. 3A is a perspective view of an EGM 100 illustrating various physical features of the device, FIG. 3B is a functional block diagram that schematically illustrates an electronic relationship of various elements of the EGM 100, and FIG. 3C illustrates various functional modules that can be stored in a memory device of the EGM 100. The embodiments shown in FIGS. 3A to 3C are provided as examples for illustrative purposes only. It will be appreciated that EGMs may come in many different shapes, sizes, layouts, form factors, and configurations, and with varying numbers and types of input and output devices, and that embodiments of the inventive concepts are not limited to the particular EGM structures described herein.

EGMs typically include a number of standard features, many of which are illustrated in FIGS. 3A and 3B. For example, referring to FIG. 3A, an EGM 100 may include a support structure, housing or cabinet 105 which provides support for a plurality of displays, inputs, outputs, controls and other features that enable a player to interact with the EGM 100.

The EGM 100 illustrated in FIG. 3A includes a number of display devices, including a primary display device 116 located in a central portion of the cabinet 105 and a secondary display device 118 located in an upper portion of the cabinet 105. A plurality of game components 155 are displayed on a display screen 117 of the primary display device 116. It will be appreciated that one or more of the display devices 116, 118 may be omitted, or that the display devices 116, 118 may be combined into a single display device. The EGM 100 may further include a player tracking display 140, a credit display 120, and a bet display 122. The credit display 120 displays a player's current number of credits, cash, account balance or the equivalent. The bet display 122 displays a player's amount wagered.

The player tracking display 140 may be used to display a service window that allows the player to interact with, for example, their player loyalty account to obtain features, bonuses, comps, etc. In other embodiments, additional display screens may be provided beyond those illustrated in FIG. 3A.

The EGM 100 may further include a number of input devices that allow a player to provide various inputs to the EGM 100, either before, during or after a game has been played. For example, the EGM 100 may include a plurality of input buttons 130 that allow the player to select options before, during or after game play. The EGM may further include a game play initiation button 132 and a cashout button 134. The cashout button 134 is utilized to receive a cash payment or any other suitable form of payment corresponding to a quantity of remaining credits of a credit display.

In some embodiments, one or more input devices of the EGM 100 are one or more game play activation devices that are each used to initiate a play of a game on the EGM 100 or a sequence of events associated with the EGM 100 following appropriate funding of the EGM 100. The example EGM 100 illustrated in FIGS. 3A and 3B includes a game play activation device in the form of a game play initiation button 132. It should be appreciated that, in other embodiments, the EGM 100 begins game play automatically upon appropriate funding rather than upon utilization of the game play activation device.

In some embodiments, one or more input devices of the EGM 100 are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In some embodiments, one or more of the display screens may a touch-sensitive display that includes a digitizer 152 and a touchscreen controller 154 (FIG. 3B). The player may interact with the EGM 100 by touching virtual buttons on one or more of the display devices 116, 118, 140. Accordingly, any of the above described input devices, such as the input buttons 130, the game play initiation button 132 and/or the cashout button 134 may be provided as virtual buttons on one or more of the display devices 116, 118, 140.

Referring briefly to FIG. 3B, operation of the primary display device 116, the secondary display device 118 and the player tracking display 140 may be controlled by a video controller 30 that receives video data from a processor 12 or directly from a memory device 14 and displays the video data on the display screen. The credit display 120 and the bet display 122 are typically implemented as simple LCD or LED displays that display a number of credits available for wagering and a number of credits being wagered on a particular game. Accordingly, the credit display 120 and the bet display 122 may be driven directly by the processor 12. In some embodiments however, the credit display 120 and/or the bet display 122 may be driven by the video controller 30.

Referring again to FIG. 3A, the display devices 116, 118, 140 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touch-screen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the EGM 100 are generally configured to display one or more game and/or non-game images, symbols, and indicia. In certain embodiments, the display devices 116, 118, 140 of the EGM 100 are configured to display any suitable visual representation or exhibition of the movement of objects; dynamic lighting; video images; images of people, characters, places, things, and faces of cards; and the like. In certain embodiments, the display devices 116, 118, 140 of the EGM 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The EGM 100 also includes various features that enable a player to deposit credits in the EGM 100 and withdraw credits from the EGM 100, such as in the form of a payout of winnings, credits, etc. For example, the EGM 100 may include a ticket dispenser 136, a bill/ticket acceptor 128, and a coin acceptor 126 that allows the player to deposit coins into the EGM 100.

While not illustrated in FIG. 3A, the EGM 100 may also include a note dispenser configured to dispense paper currency and/or a coin generator configured to dispense coins or tokens in a coin payout tray.

The EGM 100 may further include one or more speakers 150 and a microphone 151 controlled by one or more sound cards 28 (FIG. 3B). The EGM 100 illustrated in FIG. 3A includes a pair of speakers 150. In other embodiments, additional speakers, such as surround sound speakers, may be provided within or on the cabinet 105. Moreover, the EGM 100 may include built-in seating with integrated headrest speakers.

In various embodiments, the EGM 100 may generate dynamic sounds coupled with attractive multimedia images displayed on one or more of the display devices 116, 118, 140 to provide an audio-visual representation or to otherwise display full-motion video with sound to attract players to the EGM 100 and/or to engage the player during gameplay. In certain embodiments, the EGM 100 may display a sequence of audio and/or visual attraction messages during idle periods to attract potential players to the EGM 100. The videos may be customized to provide any appropriate information.

The EGM 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processor determines the amount of funds entered and displays the corresponding amount on the credit or other suitable display as described above.

In some embodiments, the EGM 100 may include an electronic payout device or module configured to fund an electronically recordable identification card or smart card or a bank or other account via an electronic funds transfer to or from the EGM 100.

FIG. 3B is a block diagram that illustrates logical and functional relationships between various components of an EGM 100. As shown in FIG. 3B, the EGM 100 may include a processor 12 that controls operations of the EGM 100. Although illustrated as a single processor, multiple special purpose and/or general purpose processors and/or processor cores may be provided in the EGM 100. For example, the EGM 100 may include one or more of a video processor, a signal processor, a sound processor and/or a communication controller that performs one or more control functions within the EGM 100. The processor 12 may be variously referred to as a "controller," "microcontroller," "microprocessor" or simply a "computer." The processor may further include one or more application-specific integrated circuits (ASICs).

Various components of the EGM 100 are illustrated in FIG. 3B as being connected to the processor 12. It will be appreciated that the components may be connected to the processor 12 through a system bus, a communication bus and controller, such as a USB controller and USB bus, a network interface, or any other suitable type of connection.

The EGM 100 further includes a memory device 14 that stores one or more functional modules 20. Various functional modules 20 of the EGM 100 will be described in more detail below in connection with FIG. 3D.

The memory device 14 may store program code and instructions, executable by the processor 12, to control the EGM 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The EGM 100 may further include a data storage device 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The EGM 100 may include a communication adapter 26 that enables the EGM 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the EGM 100 to communicate, for example, with a mobile communication device operated by a player.

The EGM 100 may include one or more internal or external communication ports that enable the processor 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processor through a universal serial bus (USB) hub (not shown) connected to the processor 12. U.S. Patent Application Publication No. 2004/0254014 describes a variety of EGMs including one or more communication ports that enable the EGMs to communicate and operate with one or more external peripherals.

In some embodiments, the EGM 100 may include a sensor, such as a camera in communication with the processor 12 (and possibly controlled by the processor 12) that is selectively positioned to acquire an image of a player actively using the EGM 100 and/or the surrounding area of the EGM 100. In one embodiment, the camera may be configured to selectively acquire still or moving (e.g., video) images and may be configured to acquire the images in either an analog, digital or other suitable format. The display devices 116, 118, 140 may be configured to display the image acquired by the camera as well as display the visible manifestation of the game in split screen or picture-in-picture fashion. For example, the camera may acquire an image of the player and the processor 12 may incorporate that image into the primary and/or secondary game as a game image, symbol or indicia.

Various functional modules of that may be stored in a memory device 14 of an EGM 100 are illustrated in FIG. 3C. Referring to FIG. 3C, the EGM 100 may include in the memory device 14 a game module 20A that includes program instructions and/or data for operating a hybrid wagering game as described herein. The EGM 100 may further include a player tracking module 20B, an electronic funds transfer module 20C, a wide area progressive module 20D, an audit/reporting module 20E, a communication module 20F, an operating system 20G and a random number generator 20H. The player tracking module 20B keeps track of the play of a player. The electronic funds transfer module 20C communicates with a back end server or financial institution to transfer funds to and from an account associated with the player. The AR interface module 20D interacts with an AR device 200 as described in more detail below. The communication module 20F enables the EGM 100 to communicate with remote servers and other EGMs using various secure communication interfaces. The operating system kernel 20G controls the overall operation of the EGM 100, including the loading and operation of other modules. The random number generator 20H generates random or pseudorandom numbers for use in the operation of the hybrid games described herein.

In some embodiments, an EGM 100 may be implemented by a desktop computer, a laptop personal computer, a personal digital assistant (PDA), portable computing device, or other computerized platform. In some embodiments, the EGM 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 3D:
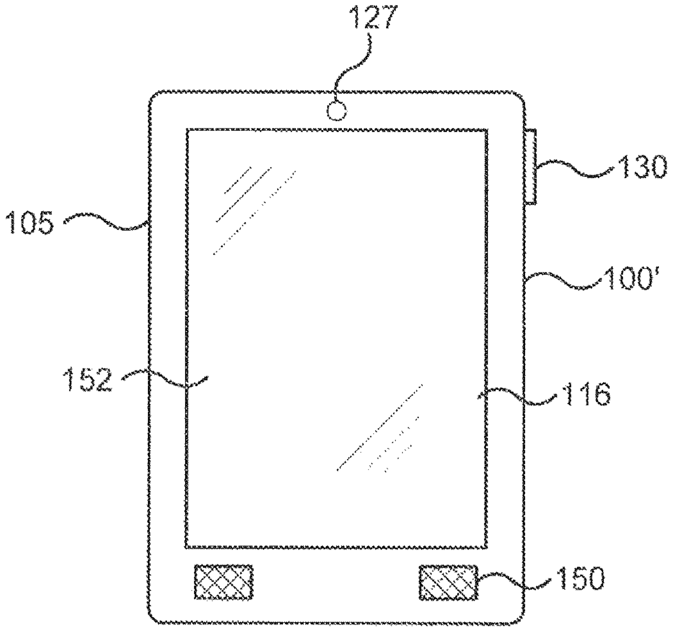
FIG. 3D is perspective view of a handheld electronic gaming device that can be configured according to some embodiments.

For example, referring to FIG. 3D, an EGM 100' may be implemented as a handheld device including a compact housing 105 on which is mounted a touchscreen display device 116 including a digitizer 152. An input button 130 may be provided on the housing and may act as a power or control button. A camera 127 may be provided in a front face of the housing 105. The housing 105 may include one or more speakers 150. In the EGM 100', various input buttons described above, such as the cashout button, gameplay activation button, etc., may be implemented as soft buttons on the touchscreen display device 116. Moreover, the EGM 100' may omit certain features, such as a bill acceptor, a ticket generator, a coin acceptor or dispenser, a card reader, secondary displays, a bet display, a credit display, etc. Credits can be deposited in or transferred from the EGM 100' electronically.

Figure 3E:
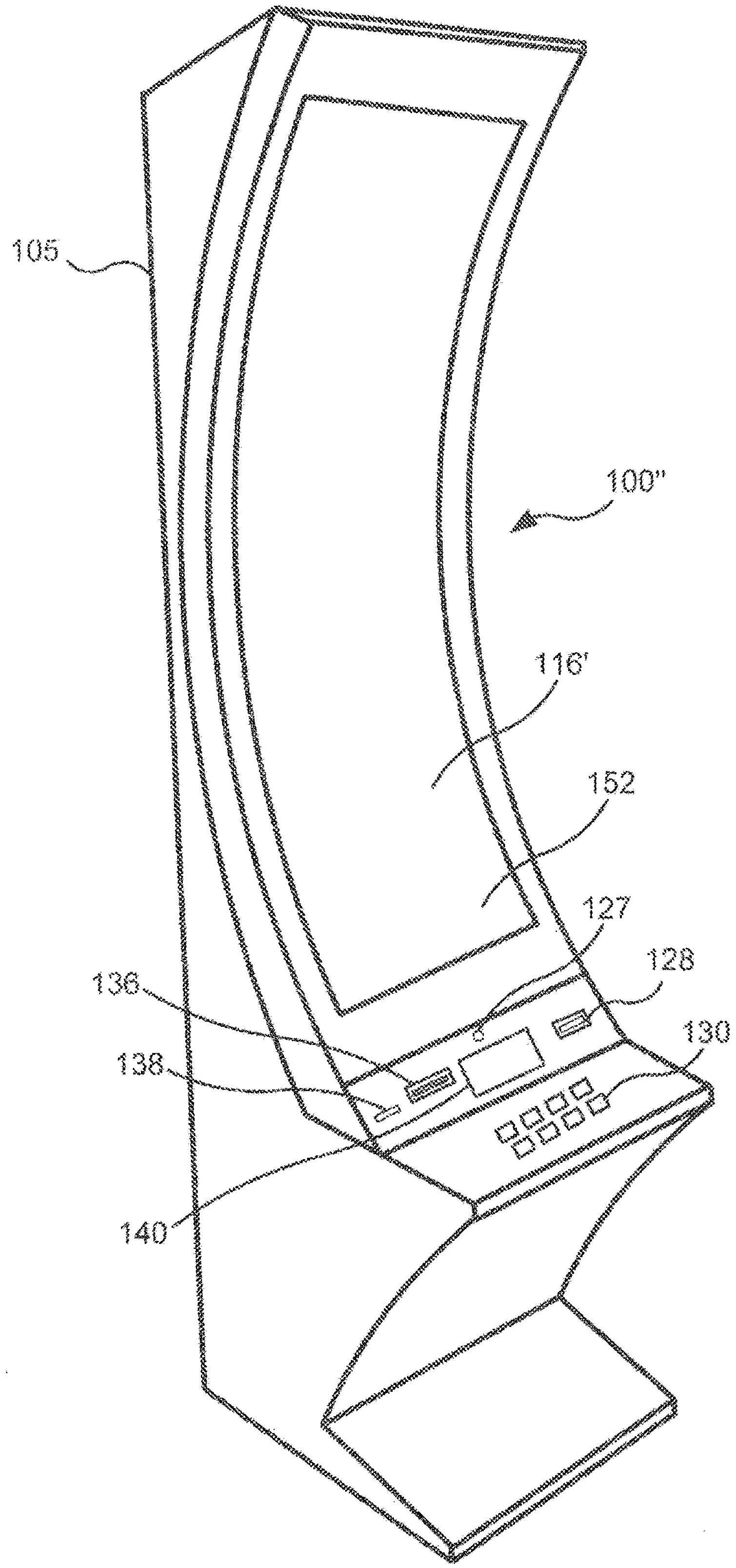
FIG. 3E is a perspective view of an electronic gaming device according to further embodiments.

FIG. 3E illustrates a standalone EGM 100" having a different form factor from the EGM 100 illustrated in FIG. 3A. In particular, the EGM 100" is characterized by having a large, high aspect ratio, curved primary display device 116' provided in the housing 105, with no secondary display device. The primary display device 116' may include a digitizer 152 to allow touchscreen interaction with the primary display device 116'. The EGM 100" may further include a player tracking display 140, a plurality of input buttons 130, a bill/ticket acceptor 128, a card reader 138, and a ticket generator 136. The EGM 100" may further include one or more cameras 127 to enable facial recognition and/or motion tracking.

Augmented Reality Applications

As more and more AR viewing devices 200 become available to players, manufacturers of EGMs may desire to incorporate support for such devices into their machines and games played on the machines. This presents a problem for EGM manufacturers, because significant programming effort may be required to support such devices. For example, EGM manufacturers may have to provide programming to define what animations are shown by an AR device, where and how such animations are displayed to a player, when the animations can be displayed to a player, and the like. Such actions require not only a large amount of programming, but also consume significant computing resources when performed in real time. Some embodiments of the inventive concepts provide a communication interface by which an EGM can integrate AR device support with a relatively low amount of customization. According to some embodiments, an EGM 100 may communicate to an AR device where on or near the EGM an animation can be displayed and notify the AR device 200 of a triggering event for the animation, but the actual processing to determine exactly where, when and how to display the animation may be performed by the AR device 200 and/or an AR controller 70.

In some embodiments, an AR device 200 can be used in conjunction with an EGM to display portions of a game on the EGM to a player. In particular, an AR device 200 may be used to display game elements, game components, game information, game animation and/or other elements to a player while the player is engaged in playing a game on the EGM 100. For example, an AR device 200 may be configured to display a special three-dimensional animation when a player wins a game, earns a prize, is awarded a bonus game, etc. The AR device 200 may display the special 3D animation within the player's field of view, which may include the display screen of the EGM 100. For example, the AR device 200 may display the special 3D animation to appear as if it is on the display screen or bursting out of the display screen. Such animations, rendered in three dimensions in such a way that they appear to the player to be part of a real scene, can enhance the game play experience for the player. However, when the special 3D animation is displayed, a portion of the display screen of the EGM 100 may be obscured by the special 3D animation.

Similarly, an AR device 200 can be used to display information about the state of the EGM 100 to the player that would normally displayed to the player in some other way, such as credit information, bet information, bonus status, paytables, etc. Some information that is displayed to the player includes information that is required by law or regulation to be displayed, or that is contractually required to be displayed, such as trademark or copyright information. When such information is displayed to the player by the AR device 200, it may be possible to free up valuable screen space on the EGM display screen for game components. These and other applications will be discussed in more detail below.

In some embodiments, the EGM 100 may inform the AR device 200 about the state of the EGM. This may include information such as: game screen layout and elements, reel positions and state, payline locations and state, service window location and state, the location of 2D and 3D elements on the screen. The EGM 100 may further inform the AR device 200 about changes in state, such as wins, losses, credit meter changes, win animations, payline wins, reel start, stop, lock, or change in direction/velocity, etc. In some embodiments, the EGM 100 may inform the AR device 200 about cabinet events, such as credit deposit/withdrawal. The EGM 100 may further inform the AR device 200 about player inputs, such as button presses, touch screen inputs, and the like. Additionally, the EGM 100 may inform the AR device 200 about the configuration of the EGM cabinet, such as location of various devices on the cabinet (display screens, input devices, card readers, etc.) For example, the EGM 100 may provide information to the AR device 200 about the location of monitors, whether they are primary or secondary, the location and function of monetary devices (e.g., bill acceptors, card readers, etc.), and whether they are active or disabled, and the location and status of game devices, such as reels, wheels, lights, etc.

With this information the AR device 100 can coordinate with the game on the EGM 100 to display AR graphics and/or other information to the player. Since the AR device 200 knows the location of various elements of the EGM 100, it can coordinate that and incorporate that into the AR experience.

For example, in an embodiment, the EGM 100 may notify the AR device 200 that a payline win has been triggered on payline 3 with 4 cherry symbols. The AR device 200 may cause an explosion to virtually come out of that payline since it now knows the information. Thus, the AR device 200 knows there is a win, why there is a win and where the win is being displayed on the EGM screen. In another example the AR device 200 may be informed by the EGM 100 when the reels have just started spinning so the AR device 200 may overlay an AR graphic that matches or complements the reel spin. In another example the AR device 200 may learn that the player has chosen a losing value in a pick bonus, and may display an AR graphic including a virtual character encouraging the player to keep playing. The AR graphic can interact with known elements of the EGM 100 or the display screen. For example, the virtual character might point at the losing elements or point at other elements on the game screen since the AR device 200 knows the location and purpose of all the elements on the screen.

The EGM 100 can also notify the AR device 200 about certain critical game-related information. For example, such information may include regulatory and legal information, such as the location and information of the credit meter, the location and information of the door icon status, the game language, the game denomination, the game speed, the location and occurrence of any tilts, copyrighted material and other information that must be shown due to legal or contractual requirements, such as a brand or logo. With this information the AR device 200 can ensure that an AR graphic displayed by the AR device 200 to the player does not obscure these key items.

Figure 4A:
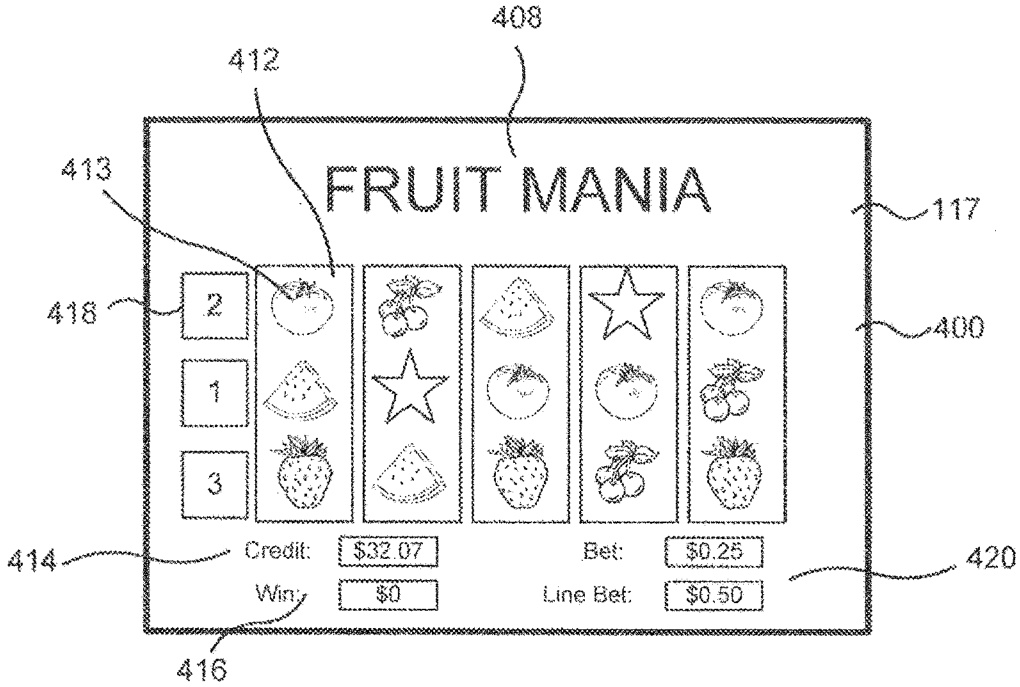
FIGS. 4A and 4B illustrate portions of a display screen of an electronic gaming machine according to some embodiments.
Figure 4B:
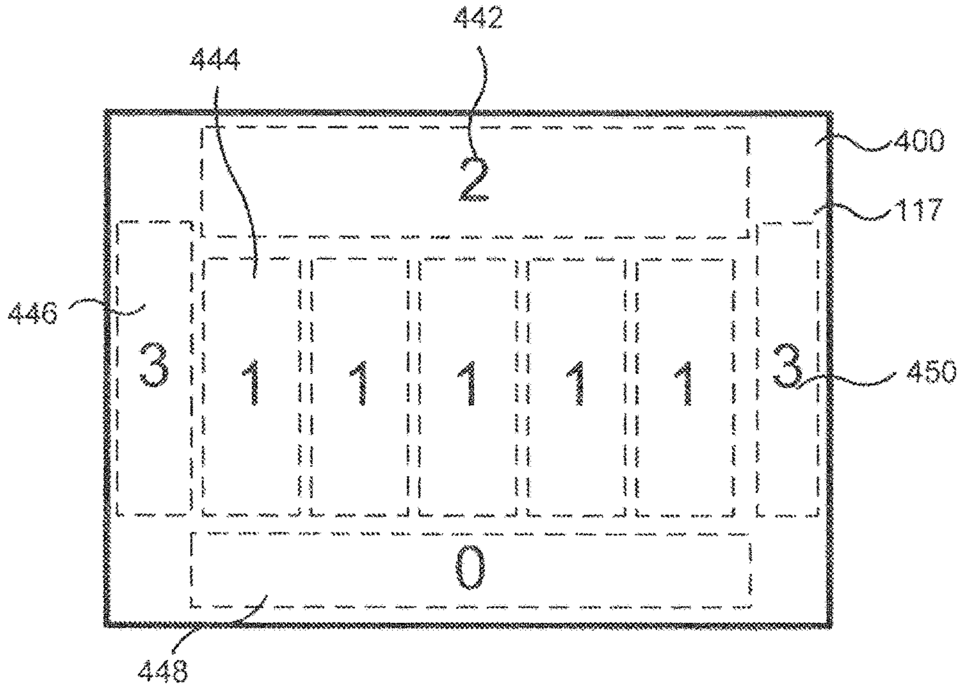

FIG. 4A illustrates an example of a display screen 117 of an EGM 100 on which a game view 400 is displayed. The illustrated game is a virtual slot game, and the game view includes a title 408 ("Fruit Mania™") and five virtual slot reels 412 on which a plurality of symbols 413 are displayed. Payline indicators 418 are provided beside the slot reels 412, and a credit display 414, amount won display 416 and bet display 420 that provide information to the player are provided below the virtual reels 412. Referring to FIG. 4B, the game view 400 can be divided into a plurality of regions, including a title region 442 where the title is displayed, game element regions 444 which correspond to the virtual reels 412, side regions 446, 450 beside the game element regions and an informational region 448, below the game element regions 444, where the credit display 414, amount won display 416 and bet display 420 are shown. The EGM 100 may communicate the dimensions of the screen 117 and the layout of the game view 400 to an AR device 200, and the AR device may use this information to determine where to display AR graphics to the player.

Figure 4C:
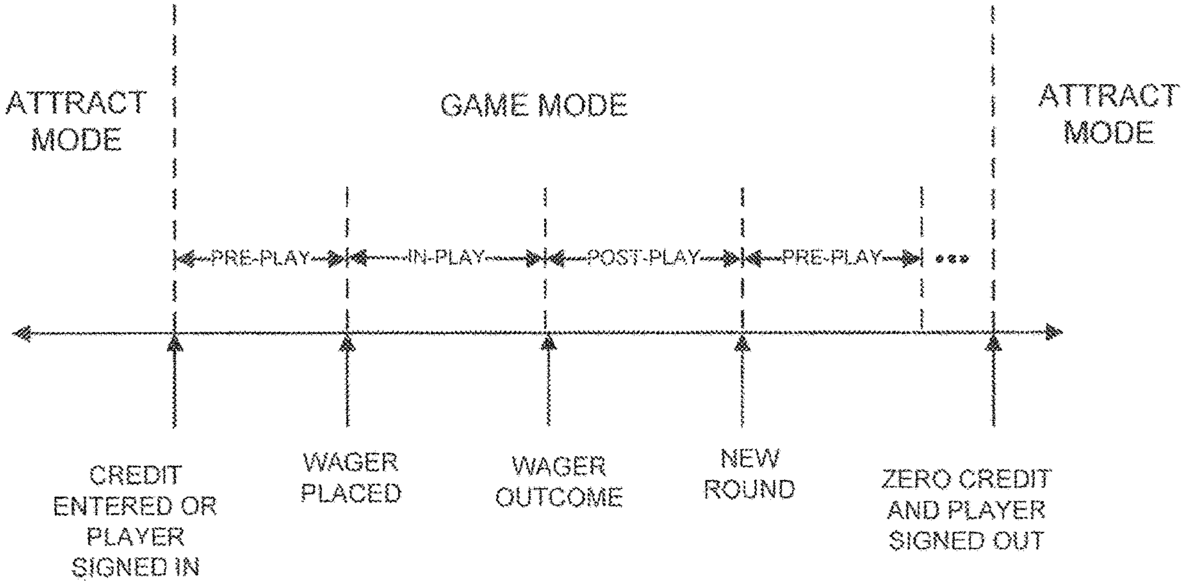
FIG. 4C is a timeline that illustrates various phases of operation of an electronic gaming machine according to some embodiments.

Brief reference is made to FIG. 4C, which is a timeline that illustrates various phases of operation of an EGM 100. Before a player has signed into the EGM 100 (using, for example, a player reward card) or deposited credits into the EGM 100, the EGM 100 may be in "attract mode", during which time the EGM may display a video and/or play sounds or music intended to attract a player. Once a player deposits credits into the EGM 100 or signs into the EGM 100, the EGM 100 may enter a game mode in which it displays a screen prompting the player to make a wager. Before the player makes a wager, the EGM 100 may be said to be in a "pre-play" mode in which the EGM 100 displays wagering options to the player. Once the player has made the wager, e.g., by selecting a wager amount and pressing a "spin" button or the like, the game enters an "in-play" mode during which the EGM 100 may display various graphics, such as spinning reels or moving tiles, to the player. Once the game has concluded the wager outcome is displayed to the player in a "post-play" mode, after which the game reverts to the "pre-play" mode. It will be appreciated that in some cases, the pre-play mode may be bypassed by the player in some games, for example, if the player presses the spin button to initiate a new game while the game is in "post-play" mode. This process is typically repeated a number of times by the player until the player has no credits left or the player decides to cash out or sign out of the EGM 100. At that point, the EGM 100 returns to attract mode.

Referring again to FIG. 4B, each of the regions 442, 444, 446, 448, 450 may have an associated value or code that indicates whether and/or when the AR device can use that area to display AR graphics to the player. For example, the regions shown in FIG. 4B are coded with a 0, 1, 2 or 3. Each of these codes may indicate when the AR device 200 may use that region to display an AR graphic. For example, codes may indicate that the AR device can use the associated region to display an AR graphic as indicated in Table 1 below:

TABLE 1

Display region availability codes

| Code | Display Region Availability |
|---|---|
| 0 | Never |
| 1 | Post-play only |
| 2 | Pre-play only |
| 3 | Any time |

The regions 442, 444, 446, 448, 450 may be indicated to the AR device 200 as windows identified by their height, width and location relative to the coordinates of the display screen 116. As indicated in Table 1, a region having a code "0" can never be used by the AR device 200 to display an AR graphic, while a region having a code "3" can always be used by the AR device 200 to display an AR graphic. A region having a code "1" can be used by the AR device 200 to display an AR graphic only when the game is in post-play mode, while a region having a code "2" can be used by the AR device 200 to display an AR graphic only when the game is in pre-play mode. Many other variations are possible. For example, a time period may be defined during a bonus game that is separate from a main game. Moreover, regions may be defined both over a display screen 117 of a display unit or outside the display screen 117. Another example method would be for the EGM 100 to notify the AR device 200 of the status of each region when the EGM 100 notifies the AR device 200 about events, as described below.

Figure 4D:
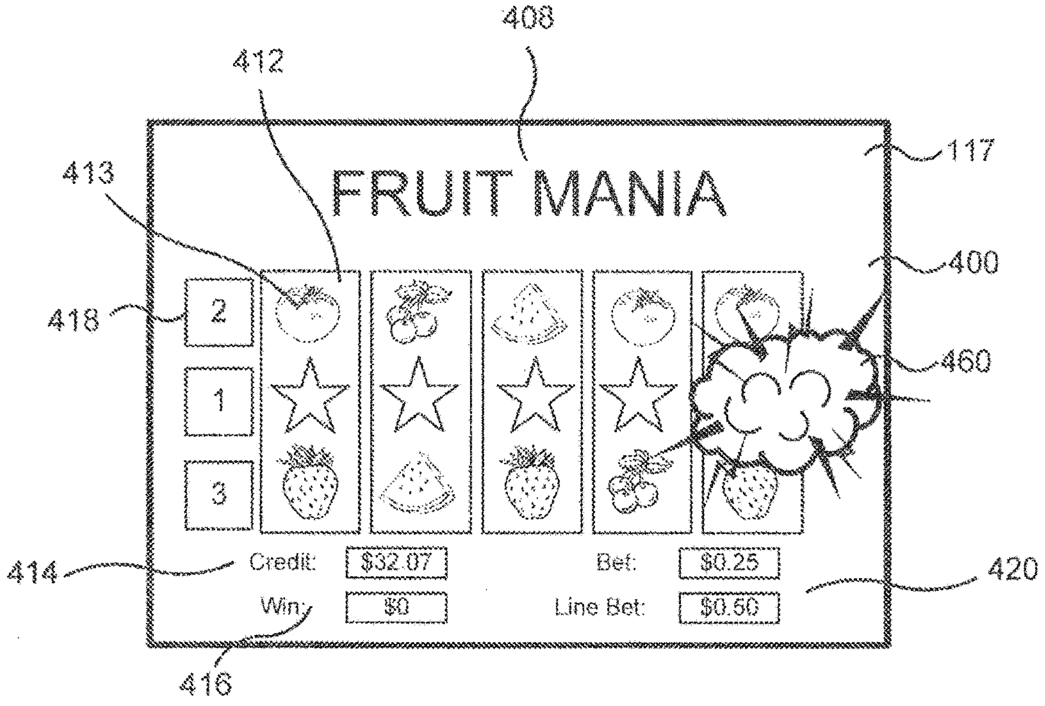
FIGS. 4D, 4E and 4F illustrate portions of a display screen of an electronic gaming machine according to some embodiments.

The EGM 100 may notify the AR device 200 of in-game or out-of-game events that may trigger the AR device to display AR graphics to the player. For example, FIG. 4D illustrates an example in which a reel spin results in a win on payline 1. The AR device 200 may display an AR graphic 460 (in this case, a three-dimensional explosion) to the player in a location that overlays one or more screen elements on the display screen 117. This is an example of a post-play event, because it occurs after the wager outcome has been determined. Because the AR device 200 knows what areas of the screen are available for display of AR graphics in a post-play mode, the AR device 200 can choose an appropriate place to display the AR graphic 460 so that it does not conceal any screen elements that should not be concealed in post-play mode. In this example, the AR graphic overlays part of the game element region 444 and side region 450 (shown in FIG. 4B), which are available for overlay of AR graphics in post-play mode.

Figure 4E:
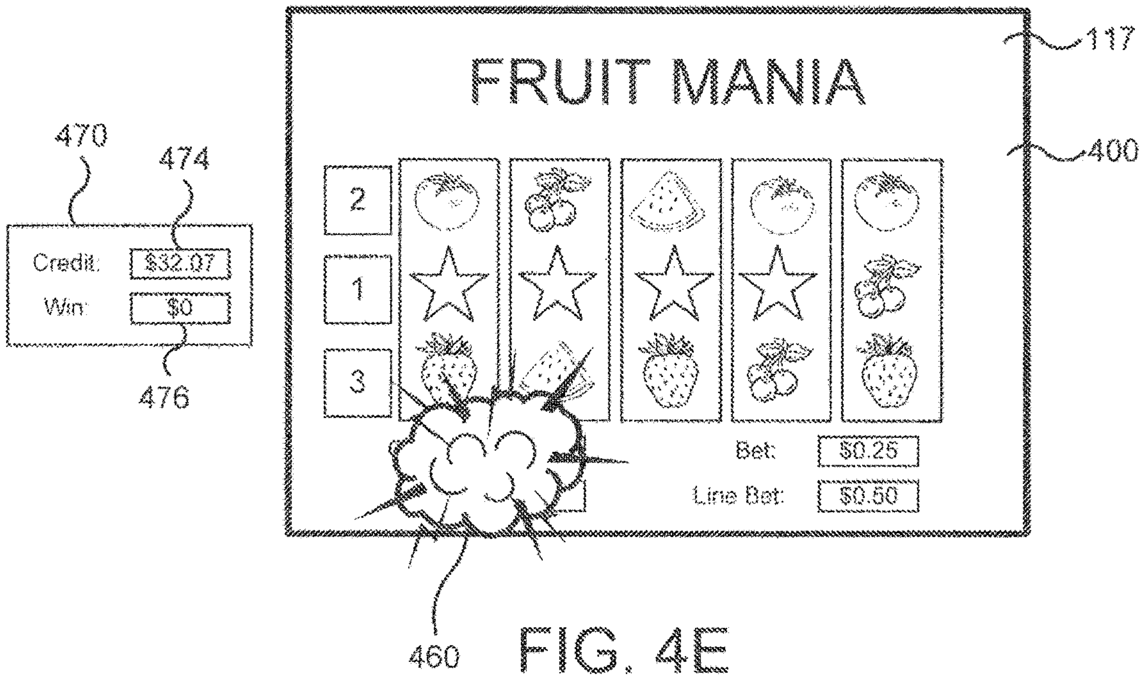

In some embodiments, a screen area may be available for the AR device 200 to use to display AR graphics provided the AR device displays the occluded information separately to the player. This would allow the AR device 200 to block player's view of the information on the screen, but still present the information virtually off screen. For example, referring to FIG. 4E, the AR device may display an AR graphic 460 that at least partially obscures the credit meter 414 and the win meter 416. The AR device 200 may display a 2D or 3D window 470 to the side of the screen 117 that includes a virtual credit meter 474 and a virtual win meter 476. In this way, the AR device 200 can ensure that any information that needs to be continuously displayed to the player can be displayed even though the AR device 200 displays an AR graphic 460 over the location of such information on the screen 117.

Similarly, the AR device 200 can also display other elements obtained from the EGM 100, such as the game logo, the copyright notice and/or game instructions, thereby freeing up screen space to be used for AR graphics.

Figure 4F:
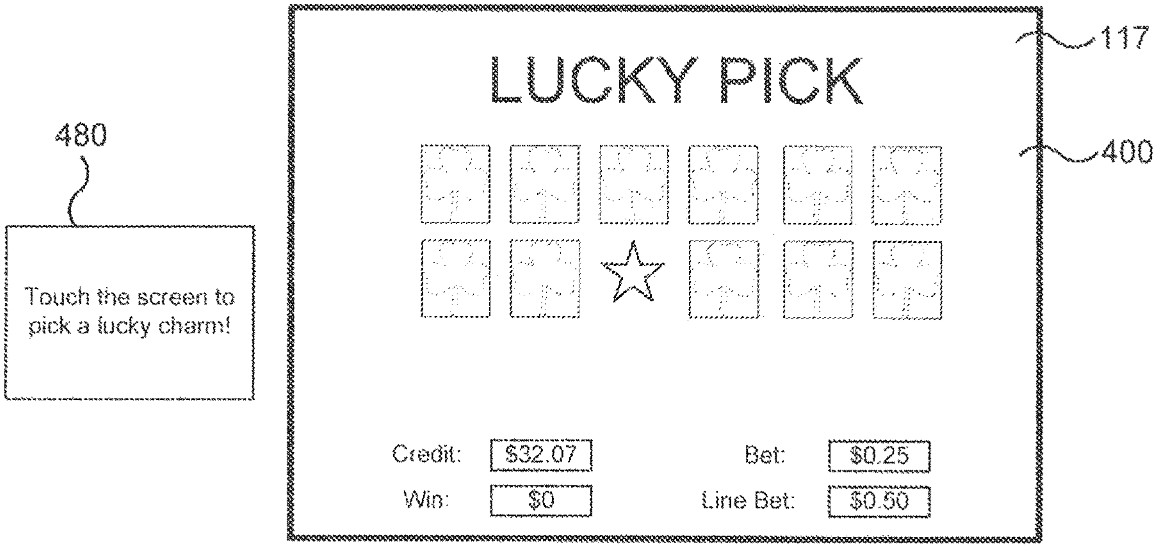

Referring to FIG. 4F, the AR device 200 may display additional information to the player in a similar manner, such as by displaying a virtual information box 480 to the player outside the screen 117 containing instructions or other information about the game to the player. Such additional information may be provided by the EGM 100 to the AR device 200 along with a command to display the information in a manner that does not occlude the screen 117. The AR device 200 may then determine how and where to display the information to the player.

Since the AR device 200 can display information to the player on behalf of the EGM 100, the AR device 200 may also enable the player to provide input via the AR device 200. For example, the EGM 100 may notify the AR device 200 that the current denomination of the game is 25 cents and that the possible denominations are 5, 25, 100, 250 cents. The AR device 200 can show this information to the player in an overlay and allow the player to select a new denomination, for example, by looking at the desired denomination and saying a command, such as "select". The AR device 200 may then notify the EGM 100 of the newly selected denomination.

In some embodiments, the AR device 200 may display information to the player on behalf of the EGM 100, and the EGM 100 may consequently not show this information, which can free up screen space for additional game graphics. For example, screen elements, such as a button panel, game logo, credit meter, door icons, service window, etc., that are required to be displayed by the EGM 100 and that would otherwise take up space on the screen 117 may be displayed instead by the AR device 200. The EGM 100 can provide the information about all the required screen elements to the AR device 200, and the AR device 200 can display the information and notify the EGM 100 that the information is being displayed. In some embodiments, the EGM 100 can enter a "full screen" mode and use the entire display space for game elements. This may provide the player with a better game experience, because more of the monitor space can be used for the game experience.

This technique may also facilitate the integration of a new game, such as an arcade-style game that was not designed for casino gaming, more easily into a casino gaming environment. For example, a game developed as an arcade-style game may not have been designed with screen space for required screen elements, such as credit meters, button panels, door icons, tilts, etc. To migrate such a game to the casino market, some effort will be required to insert these elements, which may adversely impact the graphical content or game play of the original game. With the AR protocol described herein, an AR device 200 may be used to show any necessary additional screen elements for the game which would then require fewer changes to the original game to be introduced into the gaming market.

In some embodiments, AR devices 200 may be worn by viewers other than the player of the EGM 100, such as by a spouse/friend of the player, regulator or casino personnel. For a non-player, the AR device 200 may overlay different information. For example, a player's AR device 200 would be required to not obscure some screen elements, such as the credit meter, while the AR device of a non-player observer would allow the AR device to obscure such elements.

Figure 5A:
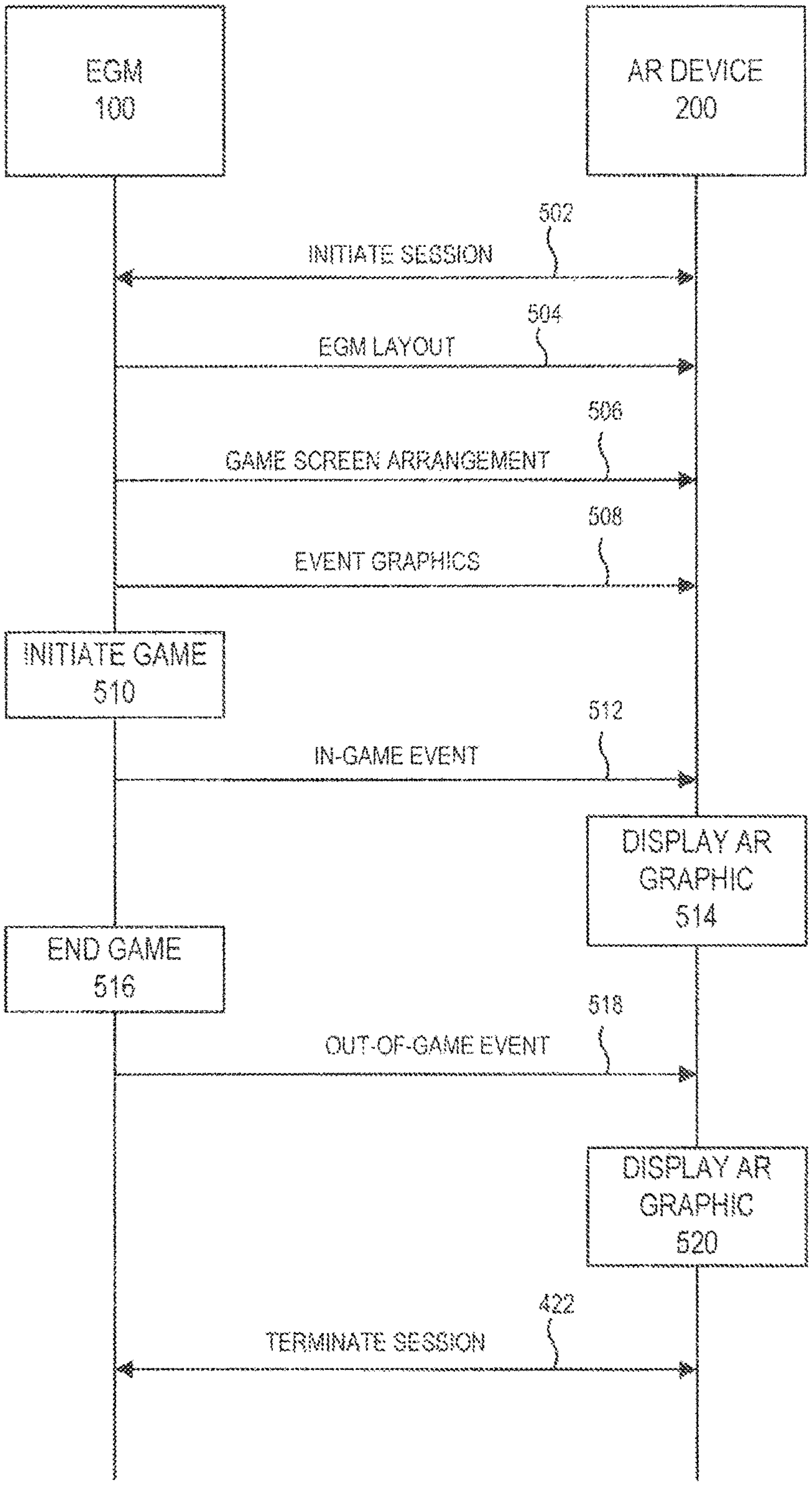
FIG. 5A is a flow diagram illustrating message flows between an electronic gaming machine and an augmented reality device according to some embodiments.

FIG. 5A is a flow diagram illustrating message flows between the AR device 200 and the EGM 100 according to some embodiments. As shown therein, the AR device 200 may initiate a session 502 with an EGM (block 502), for example, via a pairing operation in the case of a Bluetooth connection. The session initiation may take place after the EGM 100 has entered game mode (FIG. 4C) and/or may cause the EGM 100 to enter game mode. Once a session has been initiated, the EGM 100 may proceed to transmit information about the EGM 100 to the AR device, such as the EGM cabinet layout 504 and the game screen arrangement 506. The AR device 200 may also notify the EGM 100 of its configuration (software version, hardware version, etc.) and compatibilities. The EGM 100 may also transmit event graphics 508 to the AR device 200 for the AR device to use in the generation of AR graphics. The event graphics may include colors, fonts, textures, bitmaps, 3D models, still or moving images, etc. The EGM 100 may also specify what events the event graphics should be used for. The screen information may specify, for example, locations on the EGM screen that are available or unavailable for the display of AR graphics.

In the example shown in FIG. 5A, the player initiates a game on the EGM 100 at block 510. When an in-game event occurs during game play, the EGM 100 may notify the AR device of the in-game event (arrow 512). The in-game event may include a reel spin, a win, loss, bonus award, or any other event that can occur in the game. In response to receiving the notification of the in-game event, the AR device 200 may display an AR graphic associated with the in-game event to the player at block 514. Based on the information provided to the AR device 200 by the EGM 100 regarding the EGM, the display screen and the event, the AR device may determine where to display the AR graphic, what size to display the AR graphic, and/or what event graphics to use for the AR graphic. Because the AR device 200 makes these decisions, the computational processing load on the EGM 100 may be reduced. Moreover, the bandwidth requirements for the connection between the EGM 100 and the AR device 200 may be reduced, as the EGM 100 may not have to transmit 3D rendering data to the AR device 200 over the connection.

Still referring to the example of FIG. 5A, after displaying the AR graphic at block 514, the current game ends (block 516). An out-of-game event may then occur, such as a player adding credits to the machine. The EGM 100 notifies the AR device 200 of the out-of-game event (arrow 518). In response, the AR device 200 may display an AR graphic associated with the out-of-game event to the player (block 520). Finally, the session terminates at block 422.

Figure 5B:
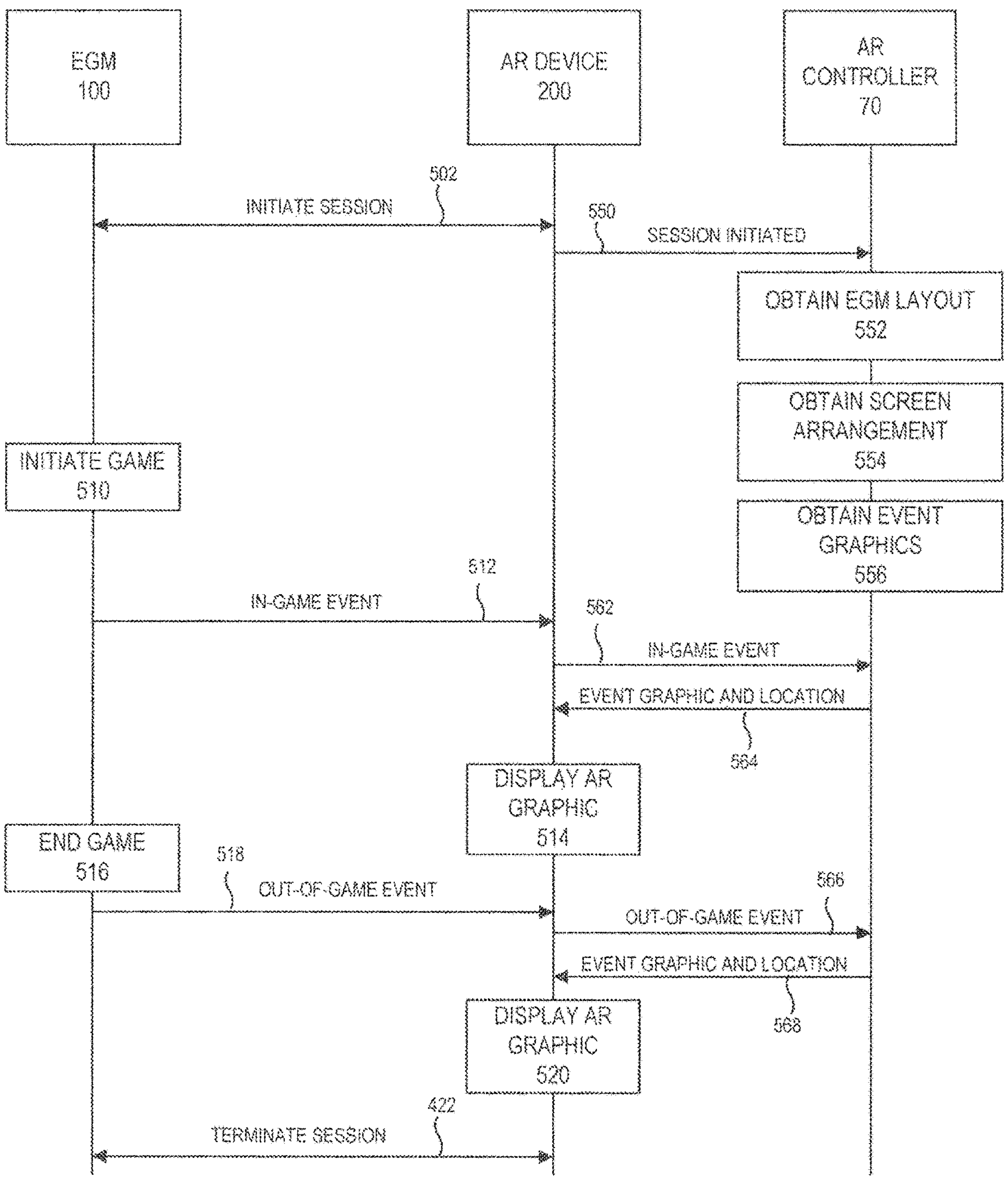
FIG. 5B is a flow diagram illustrating message flows between an electronic gaming machine, an augmented reality device and an augmented reality controller according to some embodiments.

FIG. 5B is a flow diagram illustrating message flows between the AR device 200, the EGM 100 and an AR controller 70 according to some embodiments. As shown therein, the AR device 200 may initiate a session 502 with an EGM (block 502), for example, via a pairing operation in the case of a Bluetooth connection. The AR device 200 may inform the AR controller 70 that the session has been initiated in a message 550. In some embodiments, the AR device 70 may participate in the set-up of the session between the AR device 200 and the EGM 100.

Once a session has been initiated, the AR controller may obtain information about the EGM 100, such as the EGM cabinet layout (block 552) and the game screen arrangement (block 554). The information about the EGM may be obtained from a database of game information provided to the AR controller 70 in advance, or may be obtained directly or indirectly from the EGM 100. The screen information may specify, for example, locations on the EGM screen that are available or unavailable for the display of AR graphics. The AR controller 70 may also obtain event graphics (block 556) associated with the EGM 100 for the AR device 200 to use in the generation of AR graphics.

In the example shown in FIG. 5B, the player initiates a game on the EGM 100 at block 510. When an in-game event occurs during game play, the EGM 100 may notify the AR device of the in-game event (arrow 512). The AR device 200 may forward the in-game event notification to the AR controller 70 in a message 562, and the AR controller 70 may, in response, provide an AR graphic to the AR device 200 along with location information indicating where the AR graphic should be displayed. That is, based on the information obtained by the AR controller 70 about the EGM 100, the display screen and the event, the AR controller may determine what AR graphic to display, where to display the AR graphic, what size to display the AR graphic, etc., and provide such information to the AR device 200.

In response to receiving AR graphic and location information from the AR controller 70, the AR device 200 may display the AR graphic to the player at block 514. Because the AR controller 70 makes the decisions about what graphic to display and where to display the graphic, the computational processing load on both the AR device 200 and the EGM 100 may be reduced. Moreover, the bandwidth requirements for the connection between the EGM 100 and the AR device 200 may be reduced, as the EGM 100 may not have to transmit 3D rendering data to the AR device 200 over the connection.

In some embodiments, the communication link between the AR device 200 and the AR controller 70 may have a higher bandwidth than the communication link between the AR device 200 and the EGM 100. For example, the communication link between the AR device 200 and the AR controller 70 may be a high speed Wifi connection, while the communication link between the AR device 200 and the EGM 100 may be a more limited NFC or Bluetooth connection.

Still referring to the example of FIG. 5B, after displaying the AR graphic at block 514, the current game ends (block 516). An out-of-game event may then occur, such as a player adding credits to the machine. The EGM 100 notifies the AR device 200 of the out-of-game event (arrow 518). The AR device 200 may notify the AR controller 70 of the out-of-game event in a message 566, and the AR controller 70 may respond with an AR graphic and location to be displayed by the AR device 200. The AR device 200 may then display the AR graphic associated with the out-of-game event to the player (block 520). Finally, the session terminates at block 422.

Figure 6:
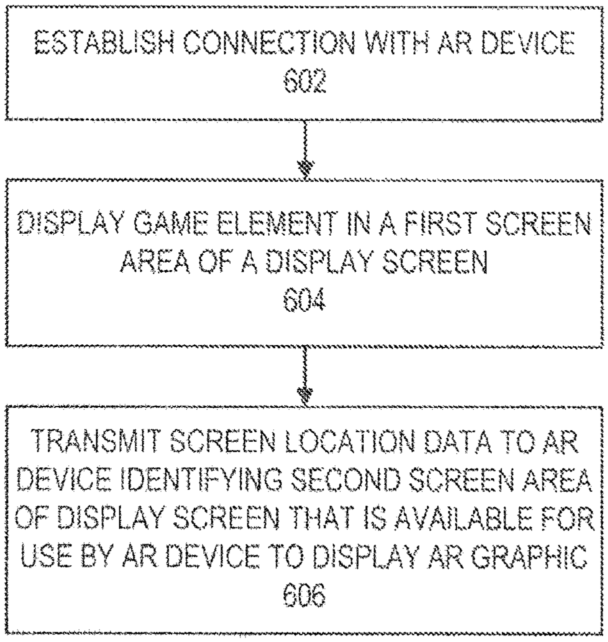
FIGS. 6-9 are flowcharts illustrating operations of systems/methods according to some embodiments.
Figure 7:
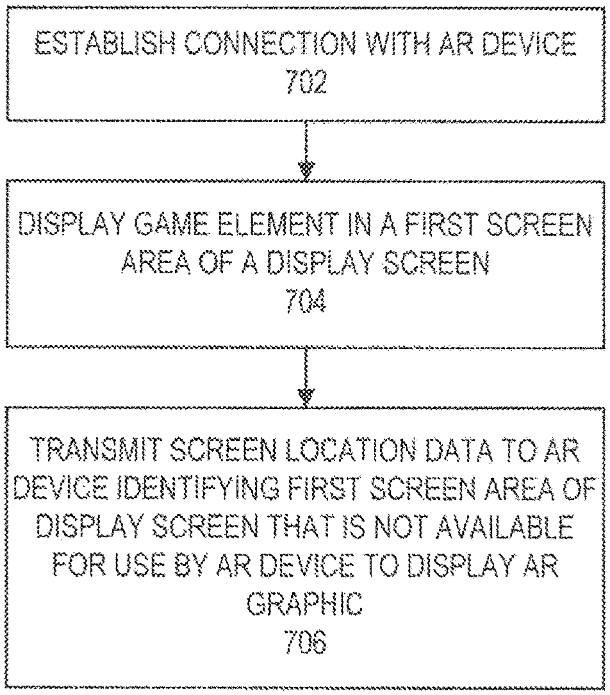

Operations of an EGM 100 according to some embodiments are illustrated in the flowcharts of FIGS. 6 and 7. Referring to FIG. 6, an EGM 100 may establish a data communications connection with an AR device 200 (block 602). In particular, the connection may be a wireless link, such as a Wifi, Bluetooth or NFC connection with the AR device 200. The data communications connection may be established with assistance from an AR controller 70. The EGM 100 may display a game element in a first screen area of a display screen of the EGM 100 (block 604) and transmit screen location data to the AR device 200 that identifies a second screen area, different from the first screen area, that is available for use by the AR device 200 to display an AR graphic (block 606). In some embodiments, the EGM 100 may transmit a game element to the AR device 200 to be displayed as an AR graphic in the second screen area and/or outside an area of the display screen.

The screen location data may include, for example, a reel position of a virtual reel displayed on the display screen, a payline location, a service window location and/or a credit meter location. In some embodiments, the EGM 100 may transmit a state or change of state of the game to the AR device 200, and the AR device 200 may determine where to display an AR graphic based on the state or change of state of the game. In some embodiments, the EGM 100 may transmit a state or change of state of a game element, such as a reel state of a virtual reel displayed on the display screen, a payline state, a service window state, payline wins, credit meter changes, win animations, and/or system events the game to the AR device 200, and the AR device 200 may display an AR graphic in response to the state or change of state.

In still further embodiments, the EGM 100 may transmit information to the AR device about location of a peripheral device on a cabinet of the electronic gaming machine outside the display screen, and the AR device 200 may use such information to determine where to display an AR graphic.

Referring to FIG. 7, in some embodiments, an EGM 100 may establish a data communications connection with an AR device 200 (block 702). The data communications connection may be established with assistance from an AR controller 70. The EGM 100 may display a game element in a first screen area of a display screen of the EGM 100 (block 704) and transmit screen location data to the AR device 200 that identifies the first screen area as being unavailable for use by the AR device 200 to display an AR graphic (block 706).

Figure 8:
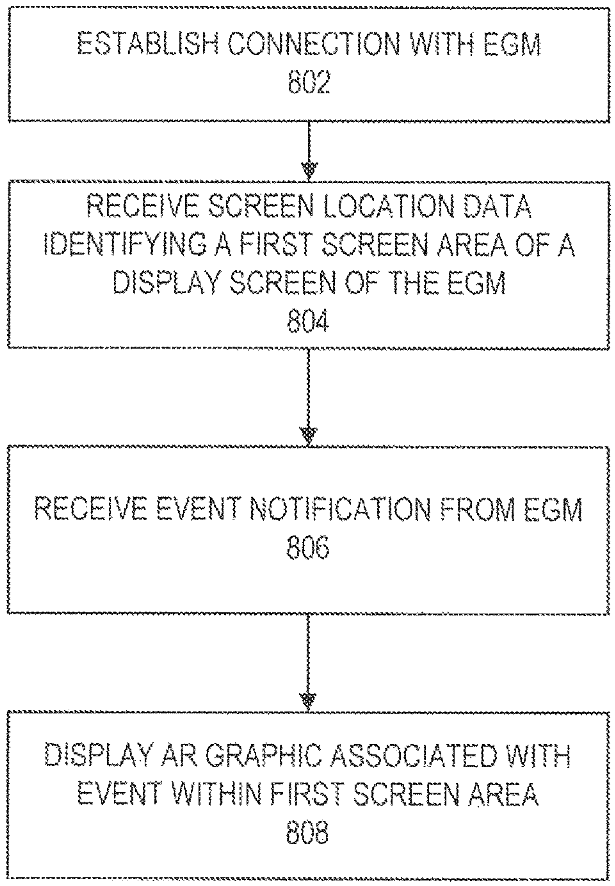
Figure 9:
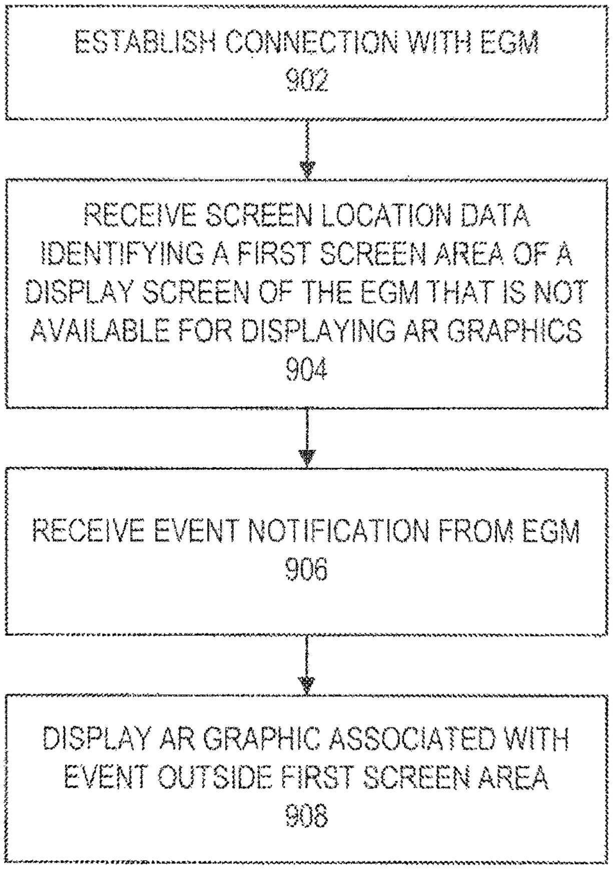

Operations of an AR device 200 according to some embodiments are illustrated in FIGS. 8 and 9. Referring to FIG. 8, an AR device 200 may establish a data communications connection to an EGM 100, such as a Wifi, Bluetooth of NFC connection to the EGM 100 (block 802). The data communications connection may be established with assistance from an AR controller 70. The AR device 200 receives screen location data from the EGM 100 identifying a first screen area of a display screen of the EGM 100 (block 804). The AR device receives an event notification from the EGM 100 informing the AR device of the occurrence of an in-game event or out-of-game event (block 806). In response to the event notification, the AR device 200 displays an AR graphic associated with the event within the identified first screen area (block 808).

Referring to FIG. 9, in some embodiments, an AR device 200 may establish a communications connection to an EGM 100 (block 902). The data communications connection may be established with assistance from an AR controller 70. The AR device 200 receives screen location data from the EGM 100 identifying a first screen area of a display screen of the EGM 100 that is not available for displaying AR graphics (block 904). The AR device receives an event notification from the EGM 100 informing the AR device of the occurrence of an in-game event or out-of-game event (block 906), and in response to the notification displays an AR graphic outside the identified first screen area so that the AR graphic does not obscure information displayed by the EGM 100 in the first screen area (block 908).

AR Controller

Figure 10:
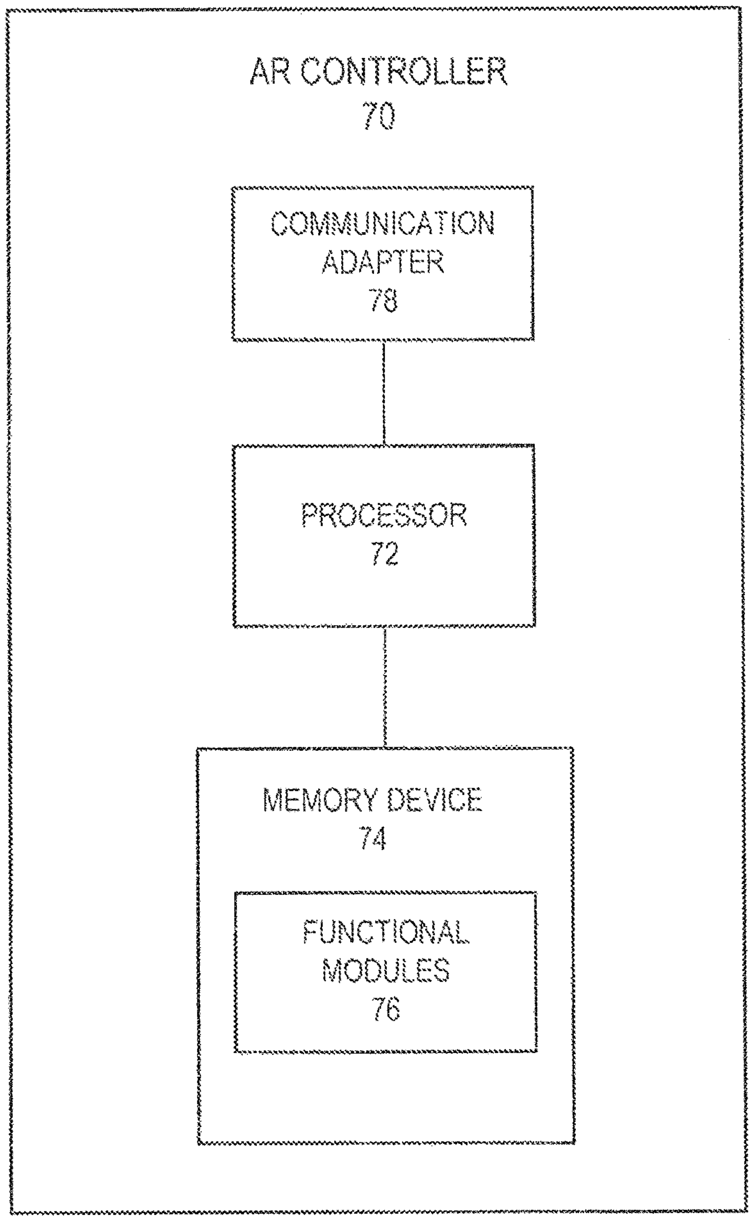
FIG. 10 is a schematic block diagram illustrating an electronic configuration for an augmented reality controller according to some embodiments.

FIG. 10 is a block diagram that illustrates various components of an AR controller 70 according to some embodiment. As shown in FIG. 10, the AR controller 70 may include a processor 72 that controls operations of the AR controller 70. Although illustrated as a single processor, multiple special purpose and/or general purpose processors and/or processor cores may be provided in the AR controller 70. For example, the AR controller 70 may include one or more of a video processor, a signal processor, a sound processor and/or a communication controller that performs one or more control functions within the AR controller 70. The processor 72 may be variously referred to as a "controller," "microcontroller," "microprocessor" or simply a "computer." The processor may further include one or more application-specific integrated circuits (ASICs).

Various components of the AR controller 70 are illustrated in FIG. 10 as being connected to the processor 72. It will be appreciated that the components may be connected to the processor 72 through a system bus, a communication bus and controller, such as a USB controller and USB bus, a network interface, or any other suitable type of connection.

The AR controller 70 further includes a memory device 74 that stores one or more functional modules 76 for performing the operations described above.

The memory device 74 may store program code and instructions, executable by the processor 72, to control the AR controller 70. The memory device 74 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The AR controller 70 may include a communication adapter 78 that enables the AR controller 70 to communicate with remote devices, such as EGMs 100 and/or a player tracking server 45 (FIG. 1) over a wired and/or wireless communication network, such as a local area network (LAN), wide area network (WAN), cellular communication network, or other data communication network.

The AR controller 70 may include one or more internal or external communication ports that enable the processor 72 to communicate with and to operate with internal or external peripheral devices, such as display screens, keypads, mass storage devices, microphones, speakers, and wireless communication devices. In some embodiments, internal or external peripheral devices may communicate with the processor through a universal serial bus (USB) hub (not shown) connected to the processor 72.

Other EGM Features

Embodiments described herein may be implemented in various configurations for EGMs 100*s*, including but not limited to: (1) a dedicated EGM, wherein the computerized instructions for controlling any games (which are provided by the EGM) are provided with the EGM prior to delivery to a gaming establishment; and (2) a changeable EGM, where the computerized instructions for controlling any games (which are provided by the EGM) are downloadable to the EGM through a data network when the EGM is in a gaming establishment. In some embodiments, the computerized instructions for controlling any games are executed by at least one central server, central controller or remote host. In such a "thin client" embodiment, the central server remotely controls any games (or other suitable interfaces) and the EGM is utilized to display such games (or suitable interfaces) and receive one or more inputs or commands from a player. In another embodiment, the computerized instructions for controlling any games are communicated from the central server, central controller or remote host to a EGM local processor and memory devices. In such a "thick client" embodiment, the EGM local processor executes the communicated computerized instructions to control any games (or other suitable interfaces) provided to a player.

In some embodiments, an EGM may be operated by a mobile device, such as a mobile telephone, tablet other mobile computing device.

In some embodiments, one or more EGMs in a gaming system may be thin client EGMs and one or more EGMs in the gaming system may be thick client EGMs. In another embodiment, certain functions of the EGM are implemented in a thin client environment and certain other functions of the EGM are implemented in a thick client environment. In one such embodiment, computerized instructions for controlling any primary games are communicated from the central server to the EGM in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal EGMs, such as desktop computers, laptop computers, tablet computers or computing devices, personal digital assistants (PDAs), mobile telephones such as smart phones, and other mobile computing devices.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In some embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

Examples of implementations of Internet-based gaming are further described in U.S. Pat. No. 8,764,566, entitled "Internet Remote Game Server," and U.S. Pat. No. 8,147, 334, entitled "Universal Game Server," which are incorporated herein by reference.

Further Definitions and Embodiments

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. An electronic gaming machine, comprising:

a processing circuit;

a display screen coupled to the processing circuit, wherein the display screen of the electronic gaming machine comprises a first screen area and a second screen area; and a transceiver coupled to the processing circuit and configured to provide wireless communications with an augmented reality (AR) display device that is separate from the electronic gaming machine;

wherein the processing circuit:

displays a game element in the first screen area of the display screen; and transmits screen location data to the AR display device identifying the second screen area on the display screen, other than the first screen area, that is available for the AR display device to overlay AR graphics in a field of view of a user of the AR display device without overlaying the game element displayed in the first screen area of the display screen, and wherein the screen location data identifies a plurality of screen areas in which game elements are displayed that are not to be obscured by images displayed by the AR display device.

2. The electronic gaming machine of claim 1, wherein the game element comprises a first game element, and wherein the processing circuit transmits a second game element to the AR display device for display by the AR display device in the second screen area of the display screen.

3. The electronic gaming machine of claim 1, wherein the processing circuit transmits a second game element to the AR display device for display by the AR display device outside of the display screen.

4. The electronic gaming machine of claim 1, wherein the processing circuit transmits a state of the game element to the AR display device, wherein the state of the game element determines whether the AR display device is permitted to overlay AR graphics in the field of view of the user of the AR display device over the game element.

5. The electronic gaming machine of claim 1, wherein the processing circuit further transmits a code to the AR display device that indicates when the AR display device can use the second screen area to display AR graphics.

6. The electronic gaming machine of claim 1, wherein the screen location data comprises locations of game elements that are legally or contractually required to be displayed by the electronic gaming machine.

7. The electronic gaming machine of claim 1, wherein the screen location data comprises a service window location and/or a credit meter location.

8. The electronic gaming machine of claim 1, wherein the processing circuit transmits to the AR display device a reel state of a virtual reel displayed on the display screen, payline state, service window state, payline wins, credit meter changes, win animations, and/or system events.

9. The electronic gaming machine of claim 1, wherein the processing circuit transmits a second game element to the AR display device and to transmit a command to the AR display device to display the second game element within the field of view of the user.

10. The electronic gaming machine of claim 9, wherein the processing circuit transmits screen location data identifying a third screen location, and wherein the command instructs the AR display device to display the second game element to overlay the third screen location in the field of view of the user.

11. The electronic gaming machine of claim 1, wherein the processing circuit transmits information to the AR display device about location of a peripheral device on a cabinet of the electronic gaming machine outside the display screen.

12. An augmented reality (AR) device, comprising:

a processing circuit;

a transceiver coupled to the processing circuit; and a display device coupled to the processing circuit and that displays virtual images within a field of view of a user;

wherein the processing circuit receives, via the transceiver, screen location data from an electronic gaming machine including a display screen within the field of view of the user, wherein the display screen comprises a first screen area and a second screen area, the screen location data identifying the first screen area on the display screen;

wherein the processing circuit displays a virtual game element in the field of view of the user that is the second screen area that is outside the first screen area of the display screen, and wherein the screen location data identifies a plurality of screen areas in which game elements are displayed that are not to be obscured by images displayed by the AR device.

13. The augmented reality device of claim 12, wherein the processing circuit receives a game event from the electronic gaming machine, and to display the virtual game element in response to the game event.

14. The augmented reality device of claim 13, wherein the screen location data identifies the second screen area on the display screen that is distinct from the first screen area, and wherein the processing circuit displays the virtual game element to overlay the second screen area on the display screen.

15. The augmented reality device of claim 12, wherein the processing circuit displays the virtual game element outside the display screen.

16. The augmented reality device of claim 12, wherein the processing circuit receives a second virtual game element from the electronic gaming machine and to display the second virtual game element within the field of view of the user.

17. The augmented reality device of claim 16, wherein the processing circuit receives a state of the second virtual game element and to display the second virtual game element overlaying the first screen area of the display screen in response to the state of the second virtual game element.

18. The augmented reality device of claim 12, wherein the screen location data comprises a reel position of a virtual reel displayed on the display screen, a payline location, a service window location and/or a credit meter location.

19. The augmented reality device of claim 12, wherein the processing circuit receives peripheral information about location of a peripheral device on a cabinet of the electronic gaming machine outside the display screen, and wherein the processing circuit displays the virtual game element in response to the peripheral information.

* * * * *